US011916967B2

(12) United States Patent
Verma et al.

(10) Patent No.: US 11,916,967 B2
(45) Date of Patent: *Feb. 27, 2024

(54) MOBILE USER IDENTITY AND/OR SIM-BASED IOT IDENTITY AND APPLICATION IDENTITY BASED SECURITY ENFORCEMENT IN SERVICE PROVIDER NETWORKS

(71) Applicant: Palo Alto Networks, Inc., Santa Clara, CA (US)

(72) Inventors: Sachin Verma, Danville, CA (US); Leonid Burakovsky, Pleasanton, CA (US); Jesse C. Shu, Palo Alto, CA (US); Lei Chang, San Jose, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/890,054

(22) Filed: Aug. 17, 2022

(65) Prior Publication Data

US 2023/0054005 A1     Feb. 23, 2023

Related U.S. Application Data

(63) Continuation of application No. 16/875,860, filed on May 15, 2020, now Pat. No. 11,457,044, which is a
(Continued)

(51) Int. Cl.
*H04L 9/40*     (2022.01)
*H04W 12/48*     (2021.01)

(52) U.S. Cl.
CPC ............ *H04L 63/20* (2013.01); *H04L 63/029* (2013.01); *H04L 63/0236* (2013.01);
(Continued)

(58) Field of Classification Search
CPC .. H04L 63/20; H04L 63/0236; H04L 63/0263; H04L 63/029; H04L 63/1408; H04L 63/1433; H04W 12/48
See application file for complete search history.

(56) References Cited

U.S. PATENT DOCUMENTS 7,283,497 B2   10/2007   Mueller
7,447,765 B2   11/2008   Aerrabotu
(Continued)

FOREIGN PATENT DOCUMENTS

CA     2921309     4/2015
CN     101335630     12/2008
(Continued)

OTHER PUBLICATIONS

Author Unknown, 3rd Generation Partnership Project; Technical Specification Group Core Network and Terminals; 3GPP Evolved Packet System (EPS); Evolved General Packet Radio Service (GPRS) Tunnelling Protocol for Control plane (GTPv2-C); Stage 3 (Release 11), 3rd Generation Partnership Project, Jun. 2014, pp. 1-231.
(Continued)

*Primary Examiner* — Shahriar Zarrineh
(74) *Attorney, Agent, or Firm* — Van Pelt, Yi & James LLP

(57) ABSTRACT

Techniques for mobile user identity and/or SIM-based IoT identity and application identity based security enforcement in service provider networks (e.g., service provider networks for mobile subscribers) are disclosed. In some embodiments, a system/process/computer program product for mobile user identity and/or SIM-based IOT identity and application identity based security enforcement in service provider networks includes monitoring network traffic on a service provider network at a security platform to identify a subscriber identity for a new session; determining an applica-
(Continued)

tion identifier for user traffic associated with the new session at the security platform; and determining a security policy to apply at the security platform to the new session based on the subscriber identity and the application identifier.

20 Claims, 19 Drawing Sheets

Related U.S. Application Data continuation of application No. 15/624,440, filed on Jun. 15, 2017, now Pat. No. 10,708,306.

(52) U.S. Cl.
CPC ...... *H04L 63/0263* (2013.01); *H04L 63/1408* (2013.01); *H04L 63/1433* (2013.01); *H04W 12/48* (2021.01)

(56) References Cited

U.S. PATENT DOCUMENTS

| | | | |
|---|---|---|---|
| 7,474,894 B2 | 1/2009 | Cardina | |
| 7,865,944 B1 | 1/2011 | Shu | |
| 8,458,786 B1 | 6/2013 | Kailash | |
| 8,464,320 B2 | 6/2013 | Archer | |
| 8,612,612 B1 | 12/2013 | Dukes | |
| 8,626,164 B2 | 1/2014 | Barkley | |
| 8,726,343 B1 | 5/2014 | Borzycki | |
| 8,880,007 B1* | 11/2014 | Mansour | H04B 1/0064 333/1.1 |
| 8,990,893 B2 | 3/2015 | Greenlee | |
| 9,081,746 B1 | 7/2015 | Helter | |
| 9,131,419 B2* | 9/2015 | Granzow | H04W 48/17 |
| 9,219,751 B1 | 12/2015 | Chen | |
| 9,325,735 B1 | 4/2016 | Huagang | |
| 9,699,261 B2 | 7/2017 | Sade | |
| 9,743,269 B1 | 8/2017 | Yadav | |
| 9,800,560 B1 | 10/2017 | Guo | |
| 10,075,827 B1 | 9/2018 | Kodaypak | |
| 10,097,546 B2 | 10/2018 | Hao | |
| 10,129,730 B2 | 11/2018 | Itagaki | |
| 10,142,290 B1 | 11/2018 | Brandwine | |
| 11,349,854 B1 | 5/2022 | Moore | |
| 2002/0156917 A1 | 10/2002 | Nye | |
| 2004/0064351 A1 | 4/2004 | Mikurak | |
| 2004/0123150 A1 | 6/2004 | Wright | |
| 2004/0199914 A1 | 10/2004 | Aerrabotu | |
| 2004/0268124 A1 | 12/2004 | Narayanan | |
| 2005/0188221 A1 | 8/2005 | Motsinger | |
| 2005/0202828 A1* | 9/2005 | Pecen | H04W 36/0055 455/453 |
| 2006/0034198 A1 | 2/2006 | Makinen | |
| 2006/0156380 A1 | 7/2006 | Gladstone | |
| 2006/0174001 A1 | 8/2006 | Zhu | |
| 2006/0236370 A1 | 10/2006 | John | |
| 2006/0262736 A1 | 11/2006 | Dong | |
| 2006/0271693 A1* | 11/2006 | Thiebaut | H04L 65/1104 709/229 |
| 2007/0276957 A1 | 11/2007 | King | |
| 2008/0167035 A1 | 7/2008 | Buckley | |
| 2008/0219218 A1* | 9/2008 | Rydnell | H04W 92/02 370/331 |
| 2009/0016245 A1* | 1/2009 | Karls | H04W 88/06 370/310 |
| 2009/0061855 A1* | 3/2009 | Sethi | H04W 36/0011 455/432.2 |
| 2009/0088147 A1 | 4/2009 | Bu | |
| 2009/0270097 A1 | 10/2009 | Gallagher | |
| 2010/0063960 A1 | 3/2010 | Lehto | |
| 2010/0064133 A1 | 3/2010 | Martin | |
| 2010/0211996 A1 | 8/2010 | McGeehan | |
| 2011/0002339 A1 | 1/2011 | Fok | |
| 2011/0045675 A1 | 2/2011 | Miya | |
| 2011/0107413 A1 | 5/2011 | Chawla | |
| 2011/0116382 A1 | 5/2011 | McCann | |
| 2011/0305138 A1 | 12/2011 | Huomo | |
| 2012/0054847 A1 | 3/2012 | Schultz | |
| 2012/0076120 A1 | 3/2012 | Kovvali | |
| 2012/0167162 A1 | 6/2012 | Raleigh | |
| 2012/0207063 A1 | 8/2012 | Shaw | |
| 2012/0275312 A1* | 11/2012 | Cormier | H04W 8/183 370/328 |
| 2012/0275348 A1 | 11/2012 | Zhou | |
| 2013/0007286 A1* | 1/2013 | Mehta | H04W 76/10 709/227 |
| 2013/0080774 A1 | 3/2013 | Combet | |
| 2013/0086631 A1 | 4/2013 | Archer | |
| 2013/0111542 A1 | 5/2013 | Shieh | |
| 2013/0166746 A1 | 6/2013 | Andreasen | |
| 2013/0227284 A1 | 8/2013 | Pfeffer | |
| 2014/0044019 A1 | 2/2014 | Anthony, Jr. | |
| 2014/0064180 A1 | 3/2014 | Kotecha | |
| 2014/0157352 A1 | 6/2014 | Paek | |
| 2014/0189861 A1 | 7/2014 | Gupta | |
| 2014/0244994 A1 | 8/2014 | Yu | |
| 2014/0247731 A1* | 9/2014 | Nagaraj | H04W 36/30 370/252 |
| 2014/0293824 A1 | 10/2014 | Castro Castro | |
| 2014/0304766 A1 | 10/2014 | Livne | |
| 2014/0321278 A1 | 10/2014 | Cafarelli | |
| 2014/0337743 A1 | 11/2014 | Branton | |
| 2014/0369188 A1 | 12/2014 | Seleznyov | |
| 2015/0043438 A1* | 2/2015 | Fwu | H04W 16/26 370/329 |
| 2015/0172959 A1 | 6/2015 | Cucala Garcia | |
| 2015/0181462 A1 | 6/2015 | Iwai | |
| 2015/0181592 A1* | 6/2015 | Bindrim | H04W 24/02 370/329 |
| 2015/0215186 A1 | 7/2015 | Alonso Franco | |
| 2015/0236914 A1 | 8/2015 | Woods | |
| 2015/0256975 A1 | 9/2015 | Wilson | |
| 2015/0288679 A1 | 10/2015 | Ben-Nun | |
| 2015/0288828 A1* | 10/2015 | Lim | H04L 41/0893 455/552.1 |
| 2015/0319185 A1 | 11/2015 | Kirti | |
| 2016/0036862 A1 | 2/2016 | Bagepalli | |
| 2016/0119842 A1* | 4/2016 | Zhang | H04W 4/70 370/332 |
| 2016/0135219 A1 | 5/2016 | Jain | |
| 2016/0180093 A1 | 6/2016 | Goss | |
| 2016/0182565 A1 | 6/2016 | Salvador | |
| 2016/0205128 A1 | 7/2016 | Holtmanns | |
| 2016/0278147 A1 | 9/2016 | Adrangi | |
| 2016/0330748 A1 | 11/2016 | Bindrim | |
| 2017/0034775 A1 | 2/2017 | Mandanapu | |
| 2017/0048739 A1 | 2/2017 | Jeong | |
| 2017/0055145 A1 | 2/2017 | Kannan | |
| 2017/0134957 A1 | 5/2017 | Gupta | |
| 2017/0163685 A1 | 6/2017 | Schwartz | |
| 2017/0181037 A1 | 6/2017 | Zaghloul | |
| 2017/0201533 A1 | 7/2017 | Targali | |
| 2017/0230832 A1 | 8/2017 | Ophir | |
| 2017/0366679 A1* | 12/2017 | Mohamed | H04L 12/1467 |
| 2017/0374695 A1 | 12/2017 | Lau | |
| 2018/0006954 A1 | 1/2018 | Arora | |
| 2018/0249528 A1 | 8/2018 | Kuge | |
| 2018/0295138 A1 | 10/2018 | Harris | |
| 2018/0302877 A1 | 10/2018 | Bosch | |
| 2018/0324652 A1 | 11/2018 | Ryu | |
| 2018/0324761 A1 | 11/2018 | Velev | |
| 2018/0332554 A1 | 11/2018 | Kawasaki | |
| 2018/0332650 A1 | 11/2018 | Kawasaki | |
| 2018/0359255 A1 | 12/2018 | Stair | |
| 2018/0359791 A1 | 12/2018 | Kawasaki | |
| 2018/0367578 A1 | 12/2018 | Verma | |
| 2018/0375900 A1 | 12/2018 | Verma | |
| 2019/0014464 A1 | 1/2019 | Kuge | |
| 2019/0021122 A1 | 1/2019 | Kawasaki | |
| 2019/0028878 A1 | 1/2019 | Kawasaki | |
| 2019/0028926 A1 | 1/2019 | Kawasaki | |
| 2019/0028933 A1 | 1/2019 | Kawasaki | |
| 2019/0090122 A1 | 3/2019 | Palnati | |

(56) References Cited

U.S. PATENT DOCUMENTS

| | | | |
|---|---|---|---|
| 2019/0110241 A1 | 4/2019 | Jain | |
| 2019/0174387 A1 | 6/2019 | Kawasaki | |
| 2019/0207986 A1 | 7/2019 | Mrowiec | |
| 2019/0222521 A1 | 7/2019 | Flinck | |

FOREIGN PATENT DOCUMENTS

| | | | | |
|---|---|---|---|---|
| CN | 101808307 | | 8/2010 | |
| CN | 102511175 | | 6/2012 | |
| CN | 105103648 | | 11/2015 | |
| CN | 105637834 A | * | 6/2016 | ........... H04L 61/203 |
| CN | 107079287 A | * | 8/2017 | ........... H04W 12/04 |
| CN | 104685957 | | 6/2019 | |
| CN | 105933279 | | 12/2019 | |
| CN | 110768933 A | * | 2/2020 | ......... H04L 63/0428 |
| DE | 60030697 | | 1/2007 | |
| EP | 3419339 | | 12/2018 | |
| EP | 3334239 | | 2/2019 | |
| EP | 3496439 | | 6/2019 | |
| HU | 230406 | | 4/2016 | |
| IN | 101444119 | | 5/2009 | |
| JP | 5937182 | | 6/2016 | |
| KR | 20090117443 | | 11/2009 | |
| WO | 2007101220 | | 3/2008 | |

OTHER PUBLICATIONS

Author Unknown, 3rd Generation Partnership Project; Technical Specification Group Core Network and Terminals; General Packet Radio Service (GPRS); GPRS Tunnelling Protocol (GTP) Across the Gn and Gp Interface (Release 11), 3rd Generation Partnership Project, Sep. 2014, pp. 1-176.

ETSI, 5G; System Architecture for the 5G System, (3GPP TS 23.501 version 15.3.0 Release 15), ETSI TS 123 501, V15.3.0, Sep. 2018.

ETSI, Technical Specification, ETSI TS 129 274, V13.5.0, Universal Mobile Telecommunications System (UMTS); LTE; 3GPP Evolved Packet System (EPS); Evolved General General Packet Radio Service (GPRS) Tunnelling Protocol for Control Plane (GTPv2-C); Stage 3, (3GPP TS 29.274 version 13.5.0 Release 13) Apr. 2016.

Ghribi et al., Understanding GPRS: The GSM Packet Radio Service, Computer Networks, vol. 34, 2000, pp. 763-779.

Gravina et al., Integration, Interconnection and Interoperability of IoT Systems, 2018.

Odinot et al., The Dutch Implementation of the Data Rentention Directive: On the Storage and Use of Telephone and Internet Traffic Data for Crime Investigation Purposes, 2014.

Ricciato et al., Traffic Monitoring and Analysis in 3G Networks: Lessons Learned from the METAWIN Project, Elektrotechnik & Informationstechnik, 2006, pp. 288-296.

* cited by examiner

ND/OR
SIM-BASED IOT IDENTITY AND
APPLICATION IDENTITY BASED SECURITY
ENFORCEMENT IN SERVICE PROVIDER
NETWORKS

CROSS REFERENCE TO OTHER APPLICATIONS

This application is a continuation of U.S. patent application Ser. No. 16/875,860, entitled MOBILE USER IDENTITY AND/OR SIM-BASED IOT IDENTITY AND APPLICATION IDENTITY BASED SECURITY ENFORCEMENT IN SERVICE PROVIDER NETWORKS filed May 15, 2020 which is incorporated herein by reference for all purposes, which is a continuation of U.S. patent application Ser. No. 15/624,440 entitled MOBILE USER IDENTITY AND/OR SIM-BASED IOT IDENTITY AND APPLICATION IDENTITY BASED SECURITY ENFORCEMENT IN SERVICE PROVIDER NETWORKS filed Jun. 15, 2017, now U.S. Pat. No. 10,708,306 which is incorporated herein by reference for all purposes.

BACKGROUND OF THE INVENTION

A firewall generally protects networks from unauthorized access while permitting authorized communications to pass through the firewall. A firewall is typically a device or a set of devices, or software executed on a device, such as a computer, that provides a firewall function for network access. For example, firewalls can be integrated into operating systems of devices (e.g., computers, smart phones, or other types of network communication capable devices). Firewalls can also be integrated into or executed as software on computer servers, gateways, network/routing devices (e.g., network routers), or data appliances (e.g., security appliances or other types of special purpose devices).

Firewalls typically deny or permit network transmission based on a set of rules. These sets of rules are often referred to as policies. For example, a firewall can filter inbound traffic by applying a set of rules or policies. A firewall can also filter outbound traffic by applying a set of rules or policies. Firewalls can also be capable of performing basic routing functions.

BRIEF DESCRIPTION OF THE DRAWINGS

Various embodiments of the invention are disclosed in the following detailed description and the accompanying drawings.

DETAILED DESCRIPTION

Figure 1A:
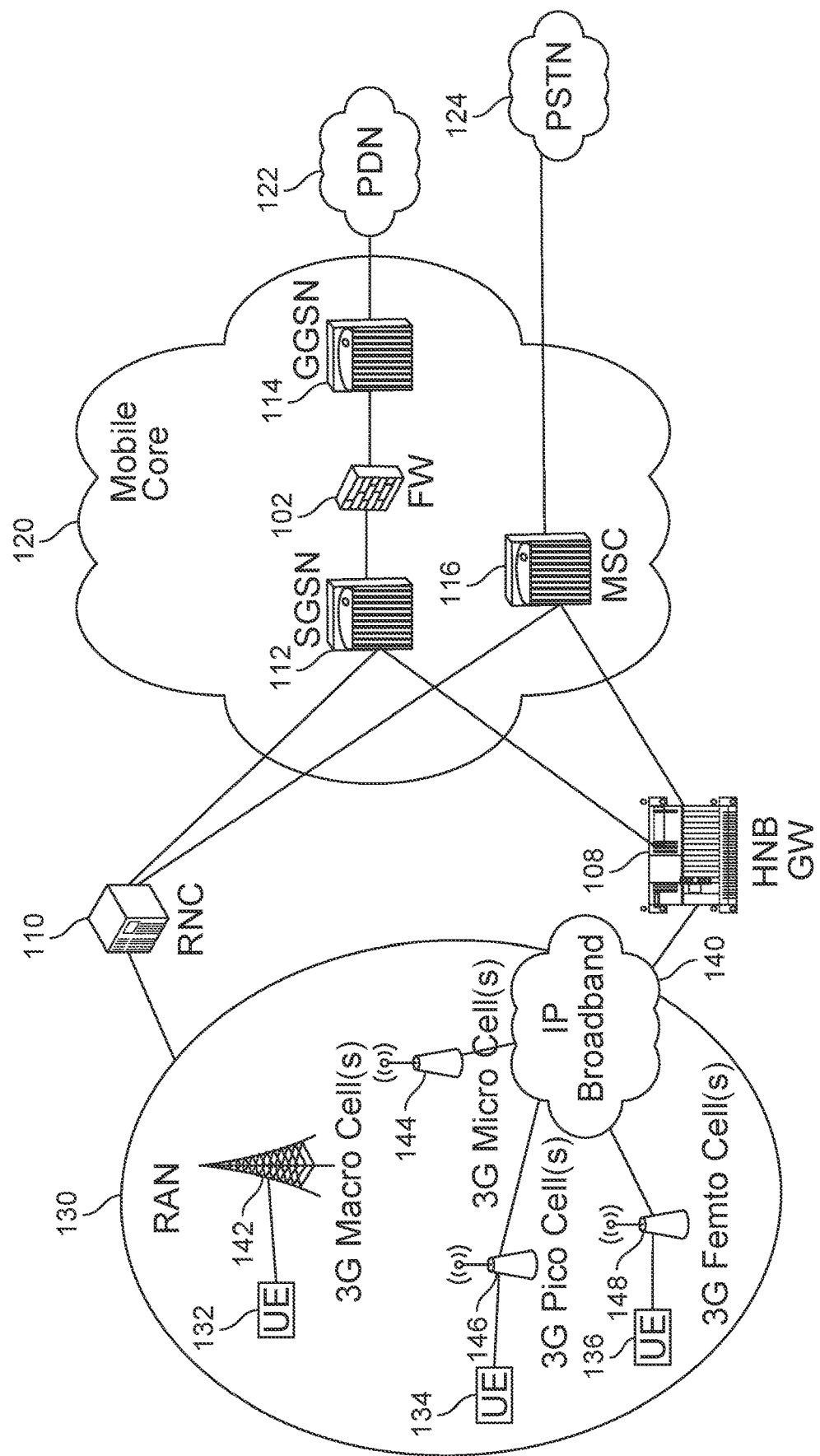
FIG. 1A is a block diagram of a 3G wireless network with a security platform for providing enhanced security in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task.

As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A firewall generally protects networks from unauthorized access while permitting authorized communications to pass through the firewall. A firewall is typically a device, a set of devices, or software executed on a device that provides a firewall function for network access. For example, a firewall can be integrated into operating systems of devices (e.g., computers, smart phones, or other types of network communication capable devices). A firewall can also be integrated into or executed as software applications on various types of devices or security devices, such as computer servers, gateways, network/routing devices (e.g., network routers), or data appliances (e.g., security appliances or other types of special purpose devices).

Firewalls typically deny or permit network transmission based on a set of rules. These sets of rules are often referred to as policies (e.g., network policies or network security policies). For example, a firewall can filter inbound traffic by applying a set of rules or policies to prevent unwanted outside traffic from reaching protected devices. A firewall can also filter outbound traffic by applying a set of rules or policies (e.g., allow, block, monitor, notify or log, and/or other actions can be specified in firewall/security rules or firewall/security policies, which can be triggered based on various criteria, such as described herein). A firewall may also apply anti-virus protection, malware detection/prevention, or intrusion protection by applying a set of rules or policies.

Security devices (e.g., security appliances, security gateways, security services, and/or other security devices) can include various security functions (e.g., firewall, anti-malware, intrusion prevention/detection, proxy, and/or other security functions), networking functions (e.g., routing, Quality of Service (QoS), workload balancing of network related resources, and/or other networking functions), and/or other functions. For example, routing functions can be based on source information (e.g., source IP address and port), destination information (e.g., destination IP address and port), and protocol information.

A basic packet filtering firewall filters network communication traffic by inspecting individual packets transmitted over a network (e.g., packet filtering firewalls or first generation firewalls, which are stateless packet filtering firewalls). Stateless packet filtering firewalls typically inspect the individual packets themselves and apply rules based on the inspected packets (e.g., using a combination of a packet's source and destination address information, protocol information, and a port number).

Application firewalls can also perform application layer filtering (e.g., using application layer filtering firewalls or second generation firewalls, which work on the application level of the TCP/IP stack). Application layer filtering firewalls or application firewalls can generally identify certain applications and protocols (e.g., web browsing using HyperText Transfer Protocol (HTTP), a Domain Name System (DNS) request, a file transfer using File Transfer Protocol (FTP), and various other types of applications and other protocols, such as Telnet, DHCP, TCP, UDP, and TFTP (GSS)). For example, application firewalls can block unauthorized protocols that attempt to communicate over a standard port (e.g., an unauthorized/out of policy protocol attempting to sneak through by using a non-standard port for that protocol can generally be identified using application firewalls).

Stateful firewalls can also perform stateful-based packet inspection in which each packet is examined within the context of a series of packets associated with that network transmission's flow of packets/packet flow (e.g., stateful firewalls or third generation firewalls). This firewall technique is generally referred to as a stateful packet inspection as it maintains records of all connections passing through the firewall and is able to determine whether a packet is the start of a new connection, a part of an existing connection, or is an invalid packet. For example, the state of a connection can itself be one of the criteria that triggers a rule within a policy.

Advanced or next generation firewalls can perform stateless and stateful packet filtering and application layer filtering as discussed above. Next generation firewalls can also perform additional firewall techniques. For example, certain newer firewalls sometimes referred to as advanced or next generation firewalls can also identify users and content. In particular, certain next generation firewalls are expanding the list of applications that these firewalls can automatically identify to thousands of applications. Examples of such next generation firewalls are commercially available from Palo Alto Networks, Inc. (e.g., Palo Alto Networks' PA Series next generation firewalls and Palo Alto Networks' VM Series virtualized next generation firewalls).

For example, Palo Alto Networks' next generation firewalls enable enterprises and service providers to identify and control applications, users, and content—not just ports, IP addresses, and packets—using various identification technologies, such as the following: App-ID™ (e.g., App ID) for accurate application identification, User-ID' (e.g., User ID) for user identification (e.g., by user or user group), and Content-ID' (e.g., Content ID) for real-time content scanning (e.g., controls web surfing and limits data and file transfers). These identification technologies allow enterprises to securely enable application usage using business-relevant concepts, instead of following the traditional approach offered by traditional port-blocking firewalls. Also, special purpose hardware for next generation firewalls implemented, for example, as dedicated appliances generally provides higher performance levels for application inspection than software executed on general purpose hardware (e.g., such as security appliances provided by Palo Alto Networks, Inc., which utilize dedicated, function specific processing that is tightly integrated with a single-pass software engine to maximize network throughput while minimizing latency for Palo Alto Networks' PA Series next generation firewalls).

Technical and Security Challenges in Today's Mobile Networks for Service Providers In today's service provider network environments, the service provider can typically only implement a static security policy for wireless devices communicating over the service provider's wireless network (e.g., the service provider cannot define a security/firewall policy on a per endpoint basis and/or a per flow basis for wireless devices communicating over the service provider's wireless network), and any changes generally require network infrastructure updates. Further, in today's service provider network environments, the service provider generally cannot implement a security policy that is based on hardware attributes or location information associated with the wireless devices for wireless devices communicating over the service provider's wireless network (e.g., the service provider cannot implement the security policy based on various other relevant parameters associated with wireless devices, such as a unique hardware identifier and/or physical location of a device communicating over the wireless network).

Thus, technical and security challenges with service provider networks exist. As such, what are needed are new and improved security techniques for such service provider network environments. Specifically, what are needed are new and improved solutions for monitoring service provider network traffic and applying security policies (e.g., firewall policies) on service provider networks.

Overview of Techniques for Enhanced Security in Mobile Networks for Service Providers Accordingly, techniques for enhanced security platforms within service provider network environments are disclosed. Specifically, various system architectures for implementing and various processes for providing security platforms within service provider network environments that can monitor GPRS Tunneling Protocol (GTP) are disclosed. More specifically, various system architectures for implementing and various processes for providing security platforms within service provider network environments that can monitor GPRS Tunneling Protocol (GTP) including, for example, GTP-C for signaling between Gateway GPRS Support Nodes (GGSN) and Serving GPRS Support Nodes (SGSN), and GTP-U for user data within the GPRS/mobile core network and between the Radio Access Network (RAN) and the GPRS/mobile core network are disclosed. For example, the disclosed techniques facilitate applying security policies based on an application, IP address, content ID, subscriber location, unique device identifier (e.g., International Mobile Equipment Identifier (IMEI) for a generally unique 3GPP device identifier, such as for mobile phones for a Global System for Mobile Communications (GSM) network), unique subscriber identifier (e.g., International Mobile Subscriber Identity (IMSI) for uniquely identifying a GSM subscriber), Radio Access Technology (RAT) (e.g., for identifying the associated RAT for the mobile device), and/or any combination thereof using next generation firewalls on service provider networks, such as further described below.

When a mobile device attaches to the network (e.g., a 3GPP/LTE EPC network), the anchor gateway (e.g., the Packet Data Network (PDN) Gateway or PGW in a 3GPP/LTE EPC network) will generally query a Policy Charging Function and Control (PCRF) entity over the Gx interface to determine the policy for that subscriber. The PCRF entity will send back to the PGW information about, for example, QoS, filters, and/or other policy related information that is stored in the PCRF entity for that subscriber that is to be applied for this subscriber (e.g., the PCRF entity is generally used to manage/control bandwidth and QoS on wireless networks; and the AAA server is generally used for authentication purposes on wireless networks).

In one embodiment, a security platform is configured to monitor the GTP communications between the SGSN and GGSN in the mobile core network (e.g., next generation firewall, which can monitor a Create PDP Request and/or various other GTP-C messages exchanged for activation, updating, and/or deactivation of the GTP sessions in the service provider's network as further described below), and the security platform (e.g., a firewall (FW), a network sensor acting on behalf of the firewall, or another device/component that can implement security policies using the disclosed techniques) is configured to apply a security policy using one or more parameters extracted from the GTP-C messages as further described below. Thus, service providers, IoT device providers, and/or system integrators can use the disclosed techniques to configure and enforce enhanced security policies using one or more parameters extracted from the GTP-C messages as further described below.

In one embodiment, a security platform is configured to monitor the GTP communications between the SGSN and GGSN in the mobile core network (e.g., next generation firewall, which can monitor GTP-U traffic during GTP sessions in the service provider's network as further described below), and the security platform (e.g., a firewall (FW), a network sensor acting on behalf of the firewall, or another device/component that can implement security policies using the disclosed techniques) is configured to apply a security policy using one or more parameters extracted from the GTP-C messages and based on the user session traffic monitored by the security platform during the GTP session (e.g., APP ID, Content ID, URL filtering, and/or other stateful packet inspection extracted from the user traffic during the GTP session) as further described below. Thus, service providers, IoT device providers, and/or system integrators can use the disclosed techniques to configure and enforce enhanced security policies using one or more parameters extracted from the GTP-C messages and information extracted from user traffic in GTP sessions as further described below.

For example, service providers, IoT device providers, and/or system integrators can apply different security policies based on IMEI, IMSI, location, and/or RAT. As another example, service providers, IoT device providers, and/or system integrators can apply different security policies based on IMEI, IMSI, location, and/or RAT based on monitored user traffic during GTP sessions.

In one embodiment, a security platform (e.g., a firewall, a network sensor acting on behalf of the firewall, or another device/component that can implement security policies) is configured to use existing 3GPP to dynamically apply security policies (e.g., granular security policies, which can be applied per subscriber (e.g., IMSI)/IP in real-time, per mobile device (e.g., IMEI)/IP in real-time, per subscriber location/IP in real-time, per RAT/IP in real-time, and/or any combinations thereof) as data calls are set-up and/or modified/updated using the disclosed techniques, such as further described below. For example, the security platform can be configured to dynamically apply security policy per IP flow for wireless devices.

In one embodiment, the signaling messages (e.g., messages exchanged for activation, updating, and deactivation of tunneling sessions) in the mobile core/service provider's core network are existing or standard messages as used in current 3GPP EPC (e.g., GTP-C messages, such as GTPv1-C for 3G networks and GTPv2-C for 4G networks) and/or other wireless network environments, and the security platform is configured to monitor such messages to extract one or more parameters that can be utilized for applying security policies from these messages, as will be further described below.

In one embodiment, a security platform is configured to monitor GTP-C messages to/from various network elements on the service provider network, such as the SGSN and GGSN (e.g., a Create PDP Request message and a Create PDP Response, an Update PDP Request and an Update PDP Response, and/or a Delete PDP Request and a Delete PDP Response), such as further described below.

In one embodiment, the security platform is configured to monitor user session traffic in tunneling sessions in the mobile core/service provider's core network (e.g., GTP-U traffic) to perform Deep Packet Inspection (DPI) security monitoring techniques that can be utilized for applying security policies based on the user session traffic, as will be further described below.

In one embodiment, a security platform is configured to monitor GTP-U sessions to/from various network elements in the service provider network as will be further described below.

In one embodiment, the security platform is configured to monitor the signaling messages (e.g., messages exchanged for activation, updating, and deactivation of GTP tunnels, such as GTP-C messages) to/from various network elements on the service provider network, such as the SGSN and GGSN (e.g., a Create PDP Request message and a Create PDP Response, an Update PDP Request and an Update PDP Response, and/or a Delete PDP Request and a Delete PDP Response) and is also configured to monitor user session traffic in tunneling sessions in the mobile core/service provider's core network (e.g., GTP-U traffic) to perform Deep Packet Inspection (DPI) security monitoring techniques that can be utilized for applying security policies based on information extracted from the signaling messages and/or user session traffic, as will be further described below.

In one embodiment, a subscriber/IP address is associated with (e.g., mapped to) a security policy to facilitate security policy enforcement per IP flow using the security platform (e.g., a next generation firewall (NGFW)). For example, the security platform can apply a granular security policy based on information extracted from the signaling messages and/or user session traffic, as will be further described below.

Example System Architectures for Implementing Enhanced Security in Mobile Networks for Service Providers FIG. 1A is a block diagram of a 3G wireless network with a security platform for providing enhanced security in accordance with some embodiments. FIG. 1A is an example service provider network environment for a 3G network architecture that includes a 3G network (e.g., and can also include Wired, Wi-Fi, 4G, 5G, and/or other networks (not shown in FIG. 1A)) to facilitate data communications for subscribers over the Internet and/or other networks. As shown in FIG. 1A, a Radio Access Network (RAN) 130 is in communication with a mobile core network 120. RAN 130 can include Macro Cell(s) 142 in the wireless network, and small cells, such as 3G Micro Cell(s) 144, 3G Pico Cell(s) 146, and 3G Femto Cells 148 in the wireless network. As shown, various User Equipment (UE) 132, 134, and 136 can communicate using various cells in RAN 130.

As also shown in FIG. 1A, the small cells, shown as 3G Micro Cell(s) 144, 3G Pico Cell(s) 146, and 3G Femto Cell(s) 148, are in network communication with a Home Node B Gateway (HNB GW) 108 over IP Broadband wireless network 140 and, in this example, the traffic is monitored/filtered using a security platform 102 (e.g., a (virtual) device/appliance that includes a firewall (FW), a network sensor acting on behalf of the firewall, or another device/component that can implement security policies using the disclosed techniques) configured to perform the disclosed security techniques as further described below. As also shown, Macro Cell(s) (NodeB) 142 is in network communication with the Radio Network Controller (RNC) 110, and the traffic is monitored/filtered using a security platform 102 (e.g., a firewall (FW), a network sensor acting on behalf of the firewall, or another device/component that can implement security policies using the disclosed techniques) configured to perform the disclosed security techniques as further described below.

As also shown in FIG. 1A, HNB GW 108 and RNC 110 are each in communication with a Packet Data Network (PDN) 122 via a Serving GPRS Support Node (SGSN) 112 and a Gateway GPRS Support Node (GGSN) 114 of a mobile (3G) core network 120 and with a Public Switched Telephone Network (PSTN) 124 via a Mobile Switching Center (MSC) 116 of mobile core network 120. As shown, the traffic passing through the mobile core network between SGSN 112 and GGSN 114 of mobile core network 120 is monitored/filtered using a security platform 102 (e.g., a firewall (FW), a network sensor acting on behalf of the firewall, or another device/component that can implement security policies using the disclosed techniques) configured to perform the disclosed security techniques as further described below.

For example, various UE, such as the UE shown at 132, 134, and 136, can include mobile and/or stationary wireless network enabled devices that can communicate over RAN 130 to access PDN 122, such as a security camera (e.g., which may be in a fixed location), a watch, mobile/smart phone, tablet, laptop, computer/PC or other computing device (which may be mobile or at a fixed location), an automobile, a baby monitor, a thermostat, and/or various other network enabled computing devices (e.g., any device associated with the Internet of Things (IoT)). Various use case scenarios applying the disclosed security techniques to wireless network enabled devices to facilitate new and enhanced security will be further described below.

Thus, in this example, a network architecture for performing the disclosed security techniques for a 3G network implementation is provided in which a security platform(s) can be provided to perform traffic monitoring and filtering to provide new and enhanced security techniques based on signaling and DPI information as further described below. As will now be apparent to one of ordinary skill in the art in view of the disclosed embodiments, a security platform(s) can similarly be provided in various other locations within the network architecture (e.g., an inline, pass-through NGFW, such as shown by FW 102, and/or implemented as agents or virtual machines (VM) instances, which can be executed on existing devices in the service provider's network, such as SGSN 112 and/or GGSN 114) and in various wireless network environments, such as 3G, 4G, 5G, and/or other wireless network environments to perform the disclosed security techniques as further described below. As also described further below, the disclosed security techniques can similarly be applied to roaming devices that connect to the mobile core of the wireless network environment.

Figure 1B:
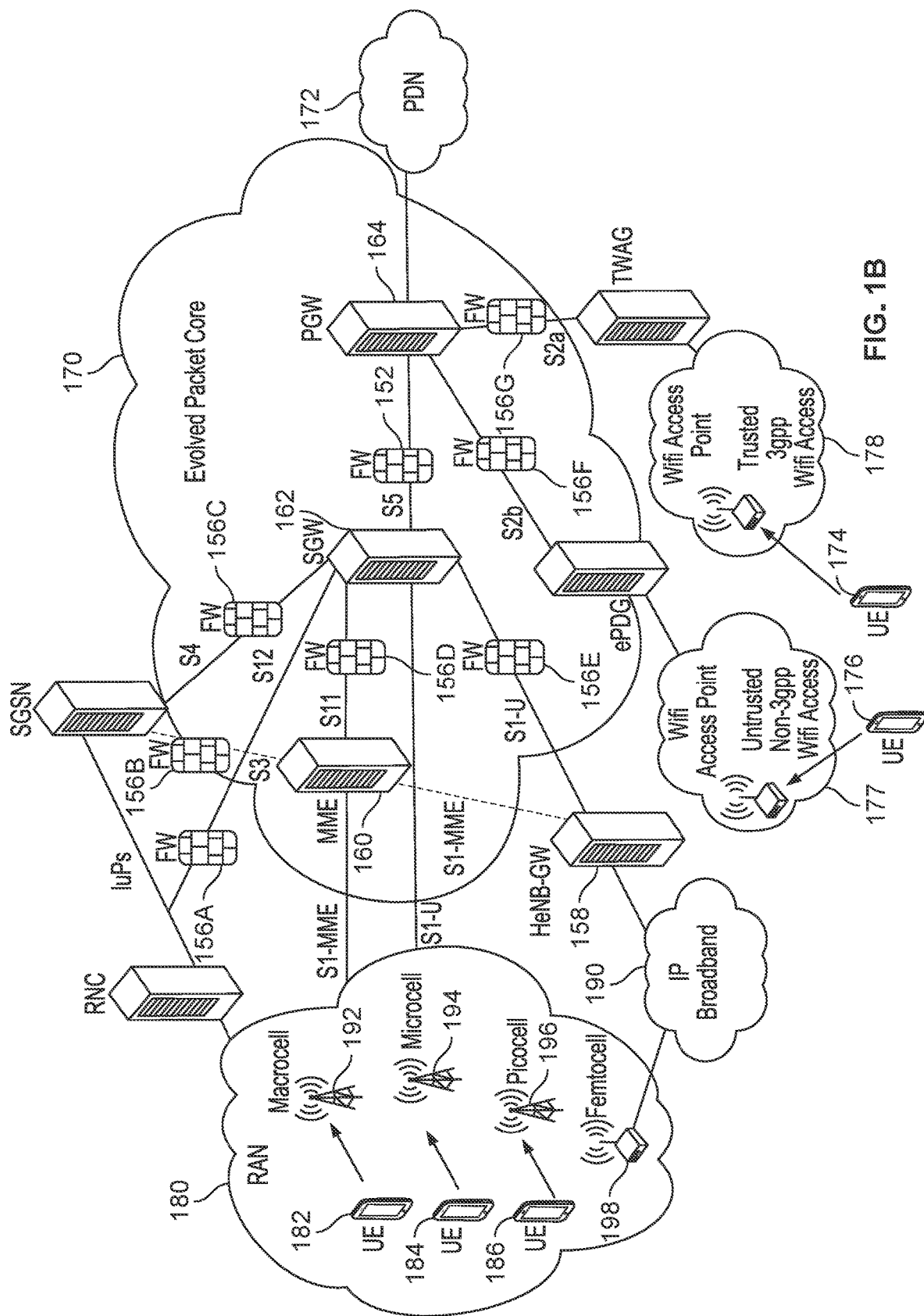
FIG. 1B is a block diagram of a 4G/LTE wireless network with a security platform for providing enhanced security in accordance with some embodiments.

FIG. 1B is a block diagram of a 4G/LTE wireless network with a security platform for providing enhanced security in accordance with some embodiments. FIG. 1B is an example service provider network environment for a 4G/Long Term Evolution (LTE) Evolved Packet Core (EPC) network architecture that includes a 4G/LTE network (e.g., and can also include Wired, Wi-Fi, 3G, 5G, and/or other networks) to facilitate data communications for subscribers over the Internet and/or other networks. As shown in FIG. 1B, a Radio Access Network (RAN) 180 is in communication with an Evolved Packet Core (EPC) network 170. RAN 180 can include LTE Macrocell(s) 192 in the wireless network, and small cells, such as LTE Microcell(s) 194, LTE Picocell(s) 196, and LTE Femtocells 198 in the wireless network. As shown, various User Equipment (UE) 182, 184, and 186 can communicate using various cells in RAN 180.

As also shown in FIG. 1B, Femtocell(s) 198, is in network communication with a Home eNode B Gateway (HeNB GW) 158 over IP Broadband wireless network 190, and, in this example, the traffic is monitored/filtered using a security platform 156E (e.g., a (virtual) device/appliance that includes a firewall (FW), a network sensor acting on behalf of the firewall, or another device/component that can implement security policies using the disclosed techniques) configured to perform the disclosed security techniques as further described below. As also shown, Macro Cell(s) 192 is in network communication with a Mobility Management Entity (MME) 160 and a Serving Gateway (SGW) 162, and the traffic is monitored/filtered using a FW 156D, and, in this example, the traffic is monitored/filtered using a security platform (e.g., a (virtual) device/appliance that includes a firewall (FW), a network sensor acting on behalf of the firewall, or another device/component that can implement security policies using the disclosed techniques) configured to perform the disclosed security techniques as further described below.

As also shown in FIG. 1B, HeNB GW 158 is in communication with a Packet Data Network (PDN) 172 via SGW 162 and a PDN Gateway (PGW) 164 of Evolved Packet Core (EPC) network 170. As shown, the traffic passing through the mobile core network between SGW 162 and GGSN/PGW 164 of EPC 170 is monitored/filtered using a security platform 152 (e.g., a (virtual) device/appliance that includes a firewall (FW), a network sensor acting on behalf of the firewall, or another device/component that can implement security policies using the disclosed techniques) configured to perform the disclosed security techniques as further described below.

For example, various UEs, such as UEs shown at 174, 176, 182, 184, and 186, can include mobile and/or stationary wireless network enabled devices that can communicate over RAN 180, Untrusted Non-3GPP Wi-Fi access 177, and/or Trusted 3GPP Wi-Fi access 178, to access PDN 172 via EPC 170 in which such communications can be monitored using security platforms 152, 156A, 156B, 156C, 156D, 156E, 156F, and/or 156G as shown in FIG. 1B (e.g., the security platforms can be located at various locations/interfaces within EPC 170 as shown in FIG. 1B) and as further described below. Example UEs can include a security camera (e.g., which may be in a fixed location), a watch, mobile/smart phone, tablet, laptop, computer/PC or other computing device (which may be mobile or at a fixed location), an automobile, a baby monitor, a thermostat, and/or various other network enabled computing devices (e.g., any device associated with the Internet of Things (IoT)). Various use case scenarios applying the disclosed security techniques to wireless network enabled devices to facilitate new and enhanced security will be further described below.

Thus, in this example, a network architecture for performing the disclosed security techniques for a 4G/LTE EPC network implementation is provided in which a security platform(s) can be provided to perform traffic monitoring and filtering to provide new and enhanced security techniques based on signaling and DPI information as further described below. As will now be apparent to one of ordinary skill in the art in view of the disclosed embodiments, a security platform(s) can similarly be provided in various other locations within the network architecture (e.g., an inline, pass-through NGFW, such as shown by FW 152, and/or implemented as agents or virtual machines (VM) instances, which can be executed on existing devices in the service provider's network, such as SGW 162 and/or PGW 164) and in various wireless network environments, such as 3G, 4G, 5G, and/or other wireless network environments to perform the disclosed security techniques as further described below. As also described further below, the disclosed security techniques can similarly be applied to roaming devices that connect to the mobile core of the wireless network environment.

Figure 2A:
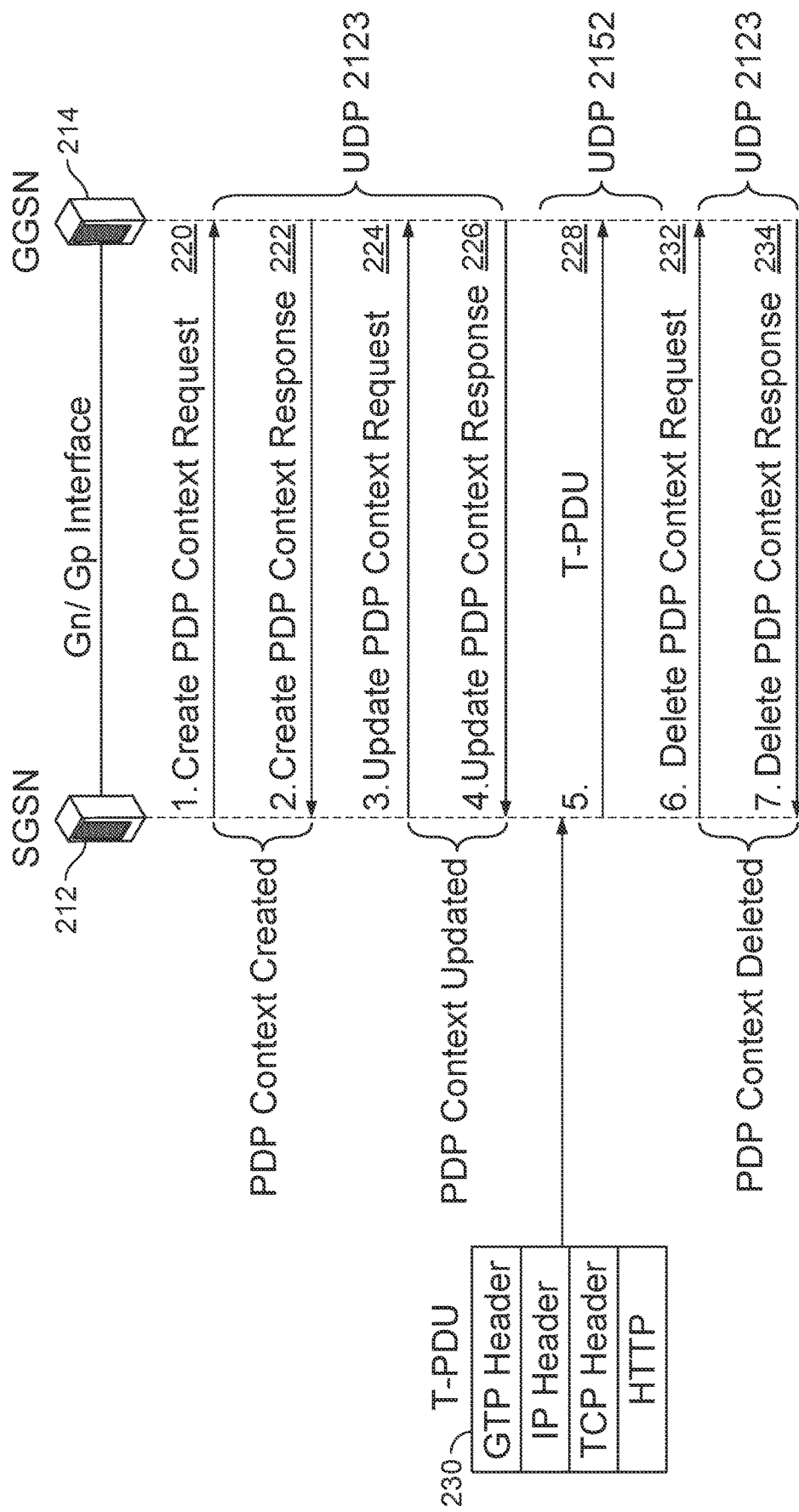
FIG. 2A is an example of GTPv1-C messages exchanged between an SGSN and a GGSN in a 3G network in accordance with some embodiments.

FIG. 2A is an example of GTPv1-C messages exchanged between an SGSN and a GGSN in a 3G network in accordance with some embodiments. Specifically, FIG. 2A shows GTPv1-C messages exchanged for activating, updating, and deactivating GTP sessions between an SGSN 212 and a GGSN 214 in a 3G network using a Gn/Gp interface. GTP is a standardized protocol that is based on the User Datagram Protocol (UDP).

Referring to FIG. 2A, a first message that is sent from SGSN 212 to GGSN 214 is a Create PDP Context Request message as shown at 220. The Create PDP Context Request message is a message to allocate a control and data channel for a new network communication access request for a mobile device in a 3G network (e.g., to be provided with a tunnel for user IP packets for network communications over a mobile service provider's network). For example, the Create PDP Context Request message can include location, hardware identity (e.g., IMEI), subscriber identity (e.g., IMSI), and/or radio access technology (RAT) information in the new network communication access request for the mobile device.

In one embodiment, the security platform monitors GTP-C messages in the mobile core to extract certain information included within GTP-C messages based on a security policy (e.g., monitoring GTPv1-C messages using a pass through firewall/NGFW that is located between the SGSN and GGSN in the mobile core such as shown in FIG. 1A and/or between various other elements/entities in the mobile core/EPC such as shown in FIG. 1B, or using a firewall/NGFW implemented as VM instances or agents executed on the SGSN, GGSN, SGW, PGW, and/or other entities in the mobile core network/EPC). For example, the security platform can monitor GTP-C messages and extract location, hardware identity (e.g., IMEI), subscriber identity (e.g., IMSI), and/or radio access technology (RAT) from the Create PDP Request message, such as further described below.

As shown in FIG. 2A, GGSN 214 sends a Create PDP Context Response message as shown at 222 to SGSN 212 to indicate whether the Create PDP Context Request is granted or not for the mobile device (e.g., whether to allow tunneled user data traffic in the mobile core network for the mobile device). The Create PDP Context Request and Create PDP Context Response messages sent using UDP communications on port 2123 are used for creating the PDP context as shown in FIG. 2A.

As also shown in FIG. 2A, an Update PDP Context Request message shown at 224 and an Update PDP Context Response message shown at 226 are exchanged between the SGSN and GGSN. For example, Update PDP Context Request/Response messages sent using UDP communications on port 2123 can be used to update one or more parameters for the connection/session.

Referring to FIG. 2A, in this example, the request for network communication access for the mobile device on the mobile service provider's network is allowed, and the SGSN sends a T-PDU message(s) shown at 228. For example, TPDU message(s) can be used for mobile user network communication (e.g., IP packets) inside the tunnel (e.g., control/signaling messages are generally communicated on port 2123 using the GTP-C protocol, and user data messages are generally communicated on port 2152 using the GTP-U protocol). As shown at 230, T-PDU messages generally include a GTP Header, IP Header, TCP Header, and HTTP payload.

As also shown in FIG. 2A, the PDP context is deleted after completion of the user data session. Specifically, the PDP context is deleted after transfer of the user data is completed and the SGSN and GGSN exchange a Delete PDP Context Request message as shown at 232 and a Delete PDP Context Response message as shown at 234. The Delete PDP Context Request and Delete PDP Context Response messages sent using UDP communications on port 2123 are used for deleting the PDP context as also shown in FIG. 2A.

In one embodiment, the disclosed techniques perform inspection of signaling/control traffic in service provider networks, such as GTP-C traffic, and inspection of tunneled user traffic in service provider networks, such as GTP-U traffic (e.g., using a security platform, such as implemented using an NGFW that is capable of performing DPI to identify an APP ID, a user ID, a content ID, perform URL filtering, and/or other firewall/security policy for security/threat detection/prevention). In one embodiment, the disclosed techniques perform inspection of signaling/control traffic in service provider networks, such as GTP-C traffic, to extract information exchanged in the GTP-C traffic (e.g., parameters, such as location information associated with the subscriber/mobile device, device ID/IMEI, subscriber information/IMSI, and/or RAT, such as further described below). In one embodiment, the disclosed techniques perform inspection of signaling/control traffic in service provider networks, such as GTP-C traffic, to extract information exchanged in the GTP-C traffic (e.g., parameters, such as described above and further described below) as well as to monitor tunneled user traffic in service provider networks (e.g., using DPI, such as described above and further described below).

In an example implementation, the security platform is configured to monitor the respective interfaces of the SGSN and GGSN to monitor control/signaling traffic (e.g., GTP-C messages) and tunneled user traffic (GTP-U) to implement a security platform with GTP monitoring capabilities that implements security policies, which can use, for example, location information associated with the subscriber/mobile device, device ID/IMEI, subscriber information/IMSI, and/or RAT, such as further described below that can be extracted from control/signaling traffic (e.g., GTP-C messages) as well as performing DPI for IP packets inside the tunnel (e.g., TPDU), as further described below. As described above, the location information/parameters, hardware identity (e.g., IMEI), subscriber identity (e.g., and/or radio access technology (RAT), such as further described below, can be extracted from the Create PDP Request message by the security platform, which can be stored (e.g., cached as associated with the IP flow) for use in applying a security policy based on this extracted information and/or in combination with DPI, such as further described below.

Figure 2B:
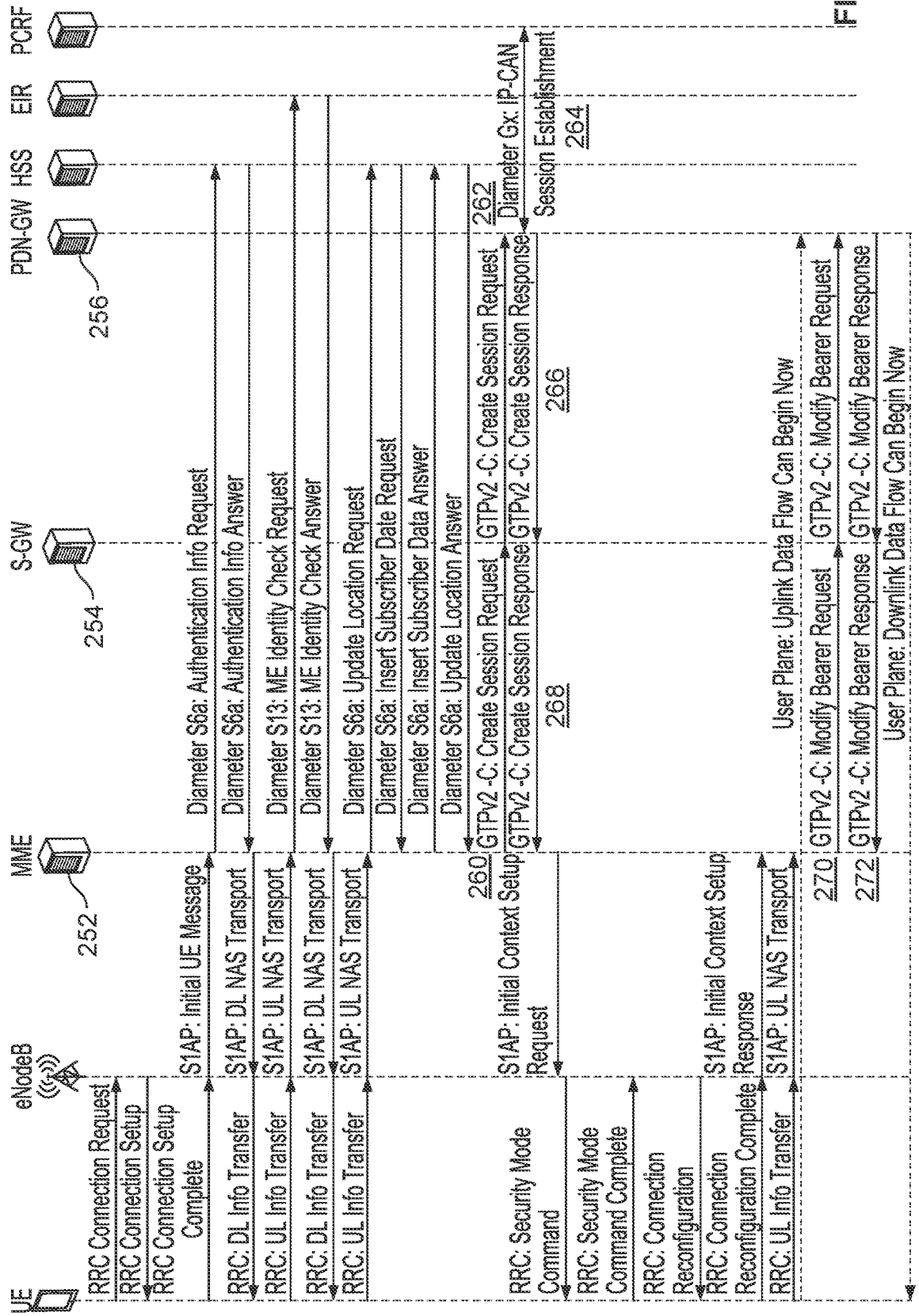
FIG. 2B is an example of GTPv2-C messages exchanged between entities including an MME, SGW, and a PGW in a 4G/LTE network in accordance with some embodiments.

FIG. 2B is an example of GTPv2-C messages exchanged between entities including an MME, SGW, and a PGW in a 4G/LTE network in accordance with some embodiments. Specifically, FIG. 2B shows GTPv2-C messages exchanged for an LTE Attach procedure with details of the GTPv2-C messages exchanged between an MME 252, SGW 254, and a PDN-GW (PGW) 256 (e.g., shown as a GGSN/PGW in FIG. 1B) in a 4G/LTE network. As discussed above, GTP is a standardized protocol that is based on the User Datagram Protocol (UDP).

Referring to FIG. 2B, a Create Session Request message is sent from MME 252 to SGW 254 as shown at 260 and then from SGW 254 to PGW 256 as shown at 262. The Create Session Request message is a message to allocate a control and data channel for a new network communication access request for a mobile device in a 4G/LTE network (e.g., to be provided with a tunnel for user IP packets for network communications over a mobile service provider's network). For example, the GTP Create Session Request message can include location, hardware identity (e.g., IMEI), subscriber identity (e.g., IMSI), and/or radio access technology (RAT) information in the new network communication access request for the mobile device.

In one embodiment, the security platform monitors GTP-C messages between the MME, SGW, and PGW to extract certain information included within GTP-C messages based on a security policy (e.g., monitoring GTPv2-C messages using a pass through firewall/NGFW that is located between the MME, SGW, and PGW or using a firewall/NGFW implemented as VM instances or agents executed on the MME, SGW, and PGW, and/or other entities in the mobile core network). For example, the security platform can monitor GTP-C messages and extract the location, hardware identity (e.g., IMEI), subscriber identity (e.g., IMSI), and/or radio access technology (RAT) from the Create Session Request message, such as further described below.

As shown in FIG. 2B, after session establishment as shown at 264, PGW 256 sends a Create Session Response message as shown at 266 to SGW 254 and then from SGW 254 to MME 252 as shown at 268 to indicate whether the Create Session Request is granted or not for the mobile device (e.g., whether to allow tunneled user data traffic in the mobile core network for the mobile device). The Create Session Request and Create Session Response messages sent using UDP communications on port 2123 are used for creating the initial setup context for the session as shown in FIG. 2B.

As also shown in FIG. 2B, a Modify Bearer Request message shown at 270 and a Modify Bearer Response message shown at 272 are exchanged between the SGW and MME. For example, Modify Bearer Request/Response messages sent using UDP communications on port 2123 can be used to update one or more parameters for the connection/session.

In one embodiment, the disclosed techniques perform inspection of signaling/control traffic in service provider networks, such as GTP-C traffic, and inspection of tunneled user traffic in service provider networks, such as GTP-U traffic (e.g., using a security platform, such as implemented using a NGFW that is capable of performing DPI to identify an APP ID, a user ID, a content ID, perform URL filtering, and/or other firewall/security policy for security/threat detection/prevention). In one embodiment, the disclosed techniques perform inspection of signaling/control traffic in service provider networks, such as GTP-C traffic, to extract information exchanged in the GTP-C traffic (e.g., parameters, such as location information associated with the subscriber/mobile device, device ID/IMEI, subscriber information/IMSI, and/or RAT, such as further described below). In one embodiment, the disclosed techniques perform inspection of signaling/control traffic in service provider networks, such as GTP-C traffic, to extract information exchanged in the GTP-C traffic (e.g., parameters, such as described above and further described below) as well as to monitor tunneled user traffic in service provider networks (e.g., using DPI, such as described above and further described below).

In an example implementation, the security platform is configured to monitor the respective interfaces of the MME, SGW, and PGW to monitor control/signaling traffic (e.g., GTP-C messages) and tunneled user traffic (GTP-U) to implement a security platform with GTP monitoring capabilities that implements security policies, which can use, for example, parameters, such as location information associated with the subscriber/mobile device, device ID/IMEI, subscriber information/IMSI, and/or RAT, and/or any other parameters/information that can be extracted from control/signaling traffic (e.g., GTP-C messages) as well as performing DPI for IP packets inside the tunnel, as further described below. As described above, the location information/parameters, hardware identity (e.g., IMEI), subscriber identity (e.g., IMSI), and/or radio access technology (RAT) can be extracted from the Create Session Request message by the security platform, which can be stored (e.g., cached as associated with the IP flow) for use in applying a security policy based on this extracted information and/or in combination with DPI, such as further described below.

The disclosed techniques are illustrated and generally described herein with respect to performing network traffic inspection of GTPv1-C and GTP-U traffic in a 3G Mobile Packet Core (MPC) and in a 4G Evolved Packet Core (EPC) using the GTPv2-C and GTP-U protocols, and/or can be similarly implemented in other mobile core networks/using other mobile network protocols (e.g., such as for 5G core networks or other mobile networks/protocol) that include location, device, subscriber, and/or RAT parameters/information (e.g., location information, hardware identity, subscriber identifier information, RAT type information and/or other user/device/network specific parameters in the respective protocols) and/or tunneled user traffic on service provider networks for mobile device communications.

Figure 3A:
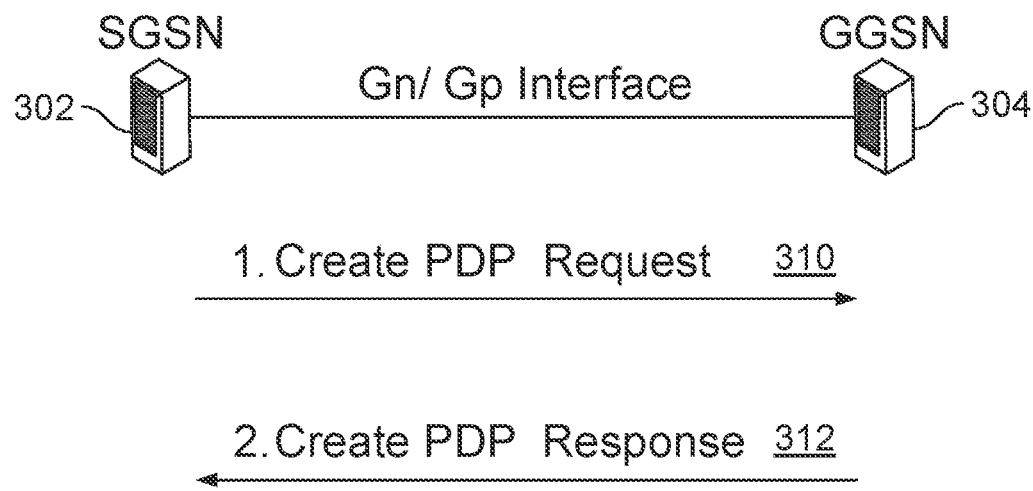
FIG. 3A is another example of a GTPv1-C message flow between an SGSN and a GGSN in a 3G network in accordance with some embodiments.

FIG. 3A is another example of a GTPv1-C message flow between an SGSN and a GGSN in a 3G network in accordance with some embodiments. Specifically, FIG. 3A shows GTPv1-C messages exchanged for a GTPv1-C Create PDP Message flow between an SGSN 302 and a GGSN 304 in a 3G network.

Referring to FIG. 3A, a Create PDP Request message is sent from SGSN 302 to GGSN 304 using the Gn/Gp interface as shown at 310. A Create PDP Response message is sent from GGSN 304 to SGSN 302 using the Gn/Gp interface as shown at 312.

Figure 3B:
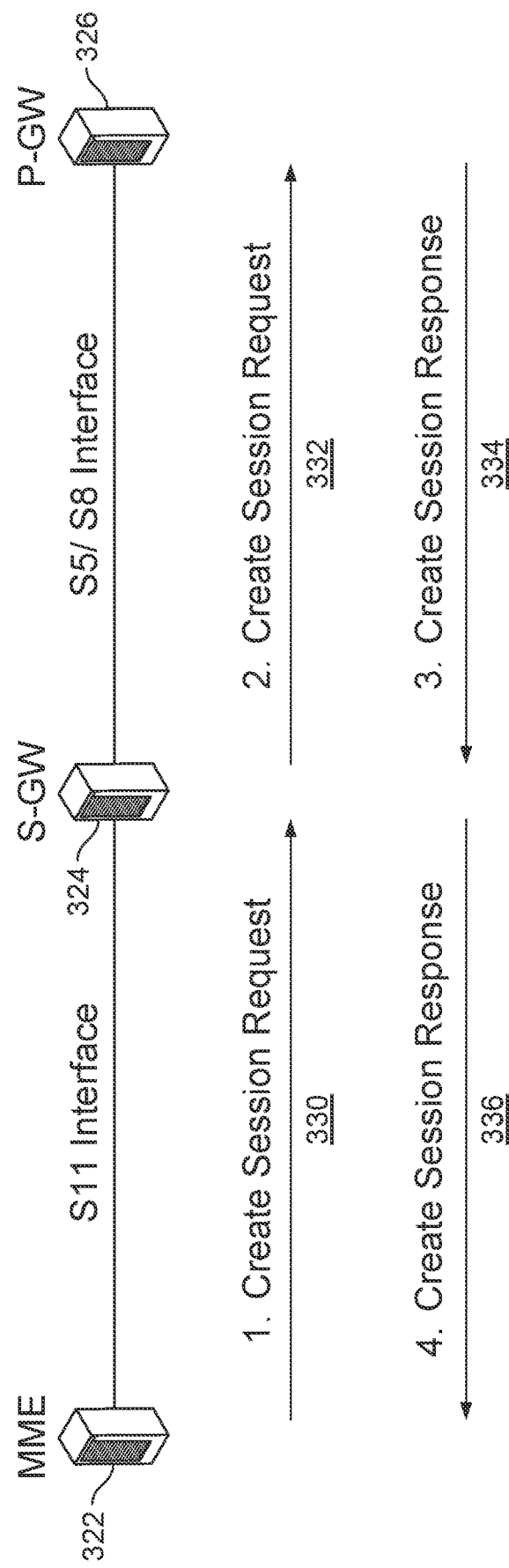
FIG. 3B is another example of a GTPv2-C message flow between an MME, SGW, and a PGW in a 4G/LTE network in accordance with some embodiments.

FIG. 3B is another example of a GTPv2-C message flow between an MME, SGW, and a PGW in a 4G/LTE network in accordance with some embodiments. Specifically, FIG. 3B shows GTPv2-C messages exchanged for a GTPv2-C Create Session Message flow between an MME 322, SGW 324, and a PDN-GW (PGW) 326 (e.g., shown as a GGSN/PGW in FIG. 1B) in a 4G/LTE network.

Referring to FIG. 3B, a Create Session Request message is sent from MME 322 to SGW 324 using the S11 interface as shown at 330 and then from SGW 324 to PGW 326 using the S5/S8 interface as shown at 332. A Create Session Response message is sent from PGW 326 to SGW 324 using the S5/S8 interface as shown at 334 and then from SGW 324 to MME 322 using the S11 interface as shown at 336.

As will now be further described below, various information/parameters, such as location, hardware identity (e.g., IMEI), subscriber identity (e.g., IMSI), and/or radio access technology (RAT) can be extracted from the control/signaling traffic (e.g., GTPv1-C Create PDP Request messages, GTPv2-C Create Session Request messages, and/or other control/signaling protocols/messages in a mobile core network) monitored by the security platform, which can be stored (e.g., cached as associated with the IP flow) for use in applying a security policy based on this extracted information and/or in combination with DPI performed by the security platform on tunneled user data traffic (e.g., GTP-U traffic and/or other tunneled user data protocols in a mobile core network).

Techniques for Location Based Security in Mobile Networks for Service Providers

In one embodiment, the disclosed techniques for enhanced security in mobile networks for service providers include providing location based security in mobile networks for service providers. For example, mobile service providers (e.g., service providers of mobile networks, service providers of mobile devices or IoTs, security service providers, or other entities that provide devices/services associated with using mobile networks) can apply the disclosed techniques to provide location based security to user devices (e.g., mobile devices of subscribers) and/or IoT devices that connect to their mobile network using 3G, 4G, or 5G Radio Access Technology (RAT).

In one embodiment, mobile service providers can apply the disclosed techniques to provide new and enhanced location based security services. For example, mobile service providers can apply the disclosed techniques to provide a location based firewall service. As another example, mobile service providers can apply the disclosed techniques to provide a location based threat detection service (e.g., a location based, basic threat detection service for known threats, a location based, advanced threat detection service for unknown threats, and/or other threat detection services that can utilize location based information to apply security policies). As yet another example, mobile service providers can apply the disclosed techniques to provide a location based threat prevention service for known threats (e.g., a location based, basic threat prevention service for known threats, a location based, advanced threat prevention service for unknown threats, and/or other threat prevention services that can utilize location based information to apply security policies). As an additional example, mobile service providers can apply the disclosed techniques to provide a location based URL filtering service.

In one embodiment, the disclosed techniques for enhanced security in mobile networks for service providers include performing location based security in mobile networks using a security platform that can implement security policies based on location information. For example, a security platform can monitor GTP-C traffic in a mobile network and process (e.g., parse) GTP-C messages to extract location information (e.g., location information can be extracted from a Create PDP Request message sent from an SGSN to a GGSN in a mobile core network).

As similarly described above, GPRS Tunneling Protocol (GTP) is a group of IP-based communication protocols used on various interfaces within the Global System for Mobile Communication (GSM), Universal Mobile Telecommunications System (UMTS), and Long Term Evolution (LTE) network. GTPv1-C and GTPv2-C are used in today's mobile networks (e.g., GTPv1-C and GTPv2-C are generally used in today's 3G and 4G/LTE mobile networks, respectively).

In one embodiment, a security platform is configured to extract user location information from a GTPv1-C Create PDP Request (e.g., in a 3G mobile network). In one embodiment, a security platform is configured to extract user location information from a GTPv2-C Create Session (e.g., in a 4G mobile network).

For example, such a Request message can generally be sent by various network elements in a mobile network (e.g., Serving Gateway (SGW), Mobility Management Entity (MME), and/or other network elements in the mobile network). Also, such a Request message can generally be sent on various interfaces (e.g., S11, S5/S8, S4, and/or other interfaces in the mobile network as part of many procedures, such as an E-UTRAN initial attach, UE requested PDN connectivity, PDP content activation, handover from trusted or untrusted non-3gpp IP access to E-UTRAN, and/or other procedures). The user Location Information Element (IE) is generally present in a GTPv2-C Create Session Request message as specified in 3GPP TS 29.274.

In one embodiment, the security platform can extract location identifiers (e.g., Location IEs) (e.g., supported by GTPv1-C, GTPv2-C, or other network protocols) that can be used to apply security in mobile networks for service providers. Example location identifiers supported by GTPv2-C that can be used to apply security in mobile networks for service providers include the following: CGI (Cell Global Identifier), SAI (Service Area Identifier), RAI (Routing Area Identifier), TAI (Tracking Area Identifier), ECGI (E-UTRAN Cell Global Identifier), LAC (Location Area Identifier), and/or other location identifiers or combinations thereof. Specifically, CGI (Cell Global Identifier) generally provides location information that includes the following parameters: MCC (Mobile Country Code), MNC (Mobile Network Code), LAC (Location Area Code), and CI (Cell Identity) (e.g., CI is generally an area of several hundreds of meters within the base station). SAI (Service Area Identifier) generally provides location information that includes the following parameters: MCC, MNC, LAC, and SAC (Service Area Code). RAI (Routing Area Identifier) generally provides location information that includes the following parameters: MCC, MNC, LAC, and RAC (Routing Area Code). TAI (Tracking Area Identifier) generally provides location information that includes the following parameters: MCC, MNC, and TAC (Tracking Area Code). ECGI (E-UTRAN Cell Global Identifier) generally provides location information that corresponds to MCC, MNC, and ECI (E-UTRAN Cell Identifier). LAC (Location Area Identifier) generally provides location information that includes the following parameters: MCC, MNC, and LAC.

For example, the security platform can monitor GTPv2-C Create Session Request messages to extract such location parameters. Specifically, CGI, SAI, RAI, TAI ECGI, and LAC are included as parameters that can be extracted from a GTPv2-C Create Session Request message. In some cases, the GTPv2-C Create Session Request message can include two or more of such location parameters (e.g., CGI and SAI). Example use case scenarios for enhanced security that can be performed on mobile networks for service providers using such location information are further described below (e.g., a fire emergency use case scenario that uses location information to restrict flying drones from being used in a specific area by/near the fire emergency as further described below).

As another example, the security platform can extract user location information from GTPv1-C Create PDP Request messages, which are generally sent from an SGSN node to a GGSN node as a part of the GPRS PDP Context Activation procedure as similarly described herein with respect to FIG. 2A. The user Location Information Element (IE) is generally present in a GTPv1-C Create PDP Context Request message as specified in 3GPP TS 29.060. Example location identifiers supported by GTPv1-C that can be used to apply security in mobile networks for service providers include the following: CGI (Cell Global Identifier), SAI (Service Area Identifier), and RAI (Routing Area Identifier), and/or other location identifiers or combinations thereof. Specifically, CGI (Cell Global Identifier) generally provides location information that includes the following parameters: MCC (Mobile Country Code), MNC (Mobile Network Code), LAC (Location Area Code), and CI (Cell Identity) (e.g., CI is generally an area of several hundreds of meters within the base station). SAI (Service Area Identifier) generally provides location information that includes the following parameters: MCC, MNC, LAC, and SAC (Service Area Code). RAI (Routing Area Identifier) generally provides location information that includes the following parameters: MCC, MNC, LAC, and RAC (Routing Area Code).

Accordingly, the disclosed techniques for enhanced security in mobile networks for service providers include performing location based security in mobile networks using a security platform that can implement security policies based on location information.

In one embodiment, the security platform can extract location information to perform security based on a security policy that can be applied based on the location information (e.g., per CGI, SAI, RAI, TAI, ECGI, and/or LAC in the mobile network). In one embodiment, the security platform can extract location information to perform threat detection based on a security policy that can be applied based on the location information (e.g., per CGI, SAI, RAI, TAI, ECGI, and/or LAC in the mobile network).

In one embodiment, the security platform can extract location information to perform threat prevention based on a security policy that can be applied based on the location information (e.g., per CGI, SAI, RAI, TAI, ECGI, and/or LAC in the mobile network).

In one embodiment, the security platform can extract location information to perform URL filtering based on a security policy that can be applied based on the location information (e.g., per CGI, SAI, RAI, TAI, ECGI, and/or LAC in the mobile network).

In one embodiment, the security platform can extract location information to perform threat detection, threat prevention, URL filtering, and/or other security techniques (e.g., including using DPI-based security techniques from monitored tunneled user traffic) based on a security policy that can be applied based on the location information (e.g., per CGI, SAI, RAI, TAI, ECGI, and/or LAC in the mobile network).

As will now be apparent to those of ordinary skill in the art, mobile service providers (e.g., service providers of mobile networks, service providers of mobile devices or IoTs, security service providers, or other entities that provide devices/services associated with using mobile networks) can provide each of these location based firewall services or combinations thereof as well as various other location based services using the disclosed techniques. Also, mobile service providers can apply the disclosed techniques to provide such location based firewall services in combination with various other enhanced security services, such as subscriber/user identity based, hardware identity based, RAT based, and/or combinations thereof, as further described below.

These and other techniques for providing enhanced security in mobile networks for service providers based on location information (e.g., and/or in combination with other DPI and/or NGFW techniques, such as Application-ID, user ID, content ID, URL filtering, etc.) will be further described below.

Techniques for Mobile Equipment Identity and/or IoT Equipment Identity Based Security Enforcement in Mobile Networks for Service Providers As discussed above, the International Mobile Equipment Identity (IMEI) is a unique identifier (e.g., a 16 or 15 digit code) that is generally used to identify a mobile device (e.g., a hardware device) to a mobile network (e.g., a GSM or UMTS network). For example, the IMEI can provide a unique hardware identifier (ID) for a mobile device/station, including a mobile/smart phone, laptop, tablet, or other computing device, or an IoT device, or any other device that has a Subscriber Identity Module (SIM) card or Embedded-SIM/Embedded Universal Integrated Circuit Card (eUICC) and communicates on a mobile network or any other device (e.g., a GSM or UMTS network). In an example implementation, Mobile Equipment Identity/IMEI and/or IoT Equipment identity (e.g., IMEI or IMEISV) as defined in 3GPP TS 23.003, and Application-ID based security that can be implemented using a NGFW by parsing GTP-C messages for IMEI/IMEISV information and inspecting tunneled traffic (e.g., DPI of GTP-U traffic) are further described herein.

In one embodiment, the disclosed techniques for enhanced security in mobile networks for service providers include providing a mobile device identifier based security in mobile networks for service providers. For example, mobile service providers can apply the disclosed techniques to provide mobile device identifier based security (e.g., in combination with Application-ID using a NGFW) to user devices (e.g., mobile devices of subscribers) and/or IoT devices that connect to their mobile network using 3G, 4G, or 5G Radio Access Technology (RAT).

In one embodiment, the disclosed techniques for enhanced security in mobile networks for service providers include providing enhanced security in mobile networks for service providers using a mobile device identifier and Application-ID. For example, mobile service providers can apply the disclosed techniques to provide enhanced security to user devices (e.g., mobile devices of subscribers) and/or IoT devices that connect to their mobile network using 3G, 4G, or 5G Radio Access Technology (RAT) based on a mobile device identifier and Application-ID (e.g., an Application-ID can be determined by a security platform monitoring tunneled user traffic that is inspected using DPI techniques implemented by a NGFW as further described below).

In one embodiment, mobile service providers can apply the disclosed techniques to provide new and enhanced security services using a mobile device identifier and/or using a mobile device identifier and Application-ID. For example, mobile service providers can apply the disclosed techniques to provide a firewall service using a mobile device identifier and Application-ID. As another example, mobile service providers can apply the disclosed techniques to provide a threat detection service using a mobile device identifier and Application-ID (e.g., a mobile device identifier based, basic threat detection service for known threats, a mobile device identifier based, advanced threat detection service for unknown threats, and/or other threat detection services that can utilize mobile device identifier based information to apply security policies). As yet another example, mobile service providers can apply the disclosed techniques to provide a threat prevention service for known threats using a mobile device identifier and Application-ID (e.g., a mobile device identifier based, basic threat prevention service for known threats, a mobile device identifier based, advanced threat prevention service for unknown threats, and/or other threat prevention services that can utilize mobile device identifier based information to apply security policies). As an additional example, mobile service providers can apply the disclosed techniques to provide a URL filtering service using a mobile device identifier and Application-ID. As a further example, mobile service providers can apply the disclosed techniques to provide an application Denial of Service (DoS) detection service for DoS attacks using a mobile device identifier and Application-ID. As another example, mobile service providers can apply the disclosed techniques to provide an application Denial of Service (DoS) prevention service for DoS attacks using a mobile device identifier and Application-ID.

In one embodiment, the disclosed techniques for enhanced security in mobile networks for service providers include performing mobile device identifier based security in mobile networks using a security platform that can implement security policies based on mobile device identifier information. For example, a security platform can monitor GTP-C traffic in a mobile network and process (e.g., parse) GTP-C messages to extract mobile device identifier information (e.g., mobile device identifier information, such as IMEI, can be extracted from a Create PDP Request message in a 3G mobile network or a Create Session Request message in a 4G mobile network).

As similarly described above, GPRS Tunneling Protocol (GTP) is a group of IP-based communication protocols used on various interfaces within the Global System for Mobile Communication (GSM), Universal Mobile Telecommunications System (UMTS), and Long Term Evolution (LTE) network. GTPv1-C and GTPv2-C are used in today's mobile networks (e.g., GTPv1-C and GTPv2-C are generally used in today's 3G and 4G/LTE mobile networks, respectively).

In one embodiment, a security platform is configured to extract mobile device identifier information (e.g., IMEI or IMEISV) from a GTPv1-C Create PDP Request (e.g., in a 3G mobile network). In one embodiment, a security platform is configured to extract mobile device identifier information (e.g., IMEI or IMEISV) from a GTPv2-C Create Session (e.g., in a 4G mobile network).

For example, a GTPv2-C Create Session Request message can generally be sent by various network elements in a mobile network (e.g., Serving Gateway (SGW), Mobility Management Entity (MME), and/or other network elements in the mobile network) as similarly described herein with respect to FIG. 2B. Also, such a Create Session Request message can generally be sent on various interfaces (e.g., S11, S5/S8, S4, and/or other interfaces in the mobile network as part of many procedures, such as an E-UTRAN initial attach, UE requested PDN connectivity, PDP content activation, handover from trusted or untrusted non-3GPP IP access to E-UTRAN, and/or other procedures). The IMEI Information Element (IE) is generally present in a GTPv2-C Create Session Request message as specified in 3GPP TS 29.274.

As another example, the security platform can extract mobile device identifier information (e.g., IMEI or IMEISV) from GTPv1-C Create PDP Request messages, which are generally sent from an SGSN node to a GGSN node as a part of the GPRS PDP Context Activation procedure as similarly described herein with respect to FIG. 2A.

Accordingly, the disclosed techniques for enhanced security in mobile networks for service providers include performing security in mobile networks using a security platform that can implement security policies (e.g., for users/subscribers of the mobile network) based on IMEI and Application-ID. In addition, the disclosed techniques for enhanced security in mobile networks for service providers include performing security in mobile networks using a security platform that can implement security policies (e.g., for mobile devices and/or IoT devices) based on IMEI and Application-ID.

In one embodiment, the security platform can extract mobile device identifier information (e.g., IMEI or IMEISV) to perform security based on a security policy that can be applied based on the mobile device identifier information. In one embodiment, the security platform can extract mobile device identifier information (e.g., IMEI or IMEISV) and perform DPI to identify an Application-ID to perform security based on a security policy that can be applied based on the mobile device identifier information and Application-ID.

In one embodiment, the security platform can extract mobile device identifier information (e.g., IMEI or IMEISV) and perform DPI to identify an Application-ID to perform security based on a security policy that can be applied based on the mobile device identifier information and Application-ID. For example, the security platform can perform threat detection by applying a security policy per IMEI and Application-ID in mobile and converged networks using the disclosed techniques. As another example, the security platform can perform threat prevention by applying a security policy per IMEI and Application-ID in mobile and converged networks using the disclosed techniques. As yet another example, the security platform can perform URL filtering by applying a security policy per IMEI and Application-ID in mobile and converged networks using the disclosed techniques. Example use case scenarios for enhanced security that can be performed on mobile networks for service providers using such mobile device identifier information (e.g., IMEI or IMEISV) and Application-ID are further described below (e.g., a service provider can restrict remote access to a network enabled thermostat that was determined to be compromised as further described below).

As will now be apparent to those of ordinary skill in the art, mobile service providers (e.g., service providers of mobile networks, service providers of mobile devices or IoTs, security service providers, or other entities that provide devices/services associated with using mobile networks) can provide each of these mobile device identifier based firewall services or combinations thereof as well as various other mobile device identifier based services using the disclosed techniques. Also, mobile service providers can apply the disclosed techniques to provide such using a mobile device identifier based firewall services in combination with various other enhanced security services, such as location based, subscriber/user identity based, RAT based, and/or combinations thereof, as further described below.

These and other techniques for providing enhanced security in mobile networks for service providers based on mobile device identifier information and Application-ID (e.g., and/or other DPI and/or NGFW techniques, such as user ID, content ID, URL filtering, etc.) will be further described below.

Techniques for Mobile User Identity and/or SIM-Based IoT Identity and Application Identity Based Security Enforcement in Mobile Networks for Service Providers In one embodiment, the disclosed techniques for enhanced security in mobile networks for service providers include providing a mobile user identity and/or SIM-based IoT identity based security in mobile networks for service providers. For example, mobile service providers can apply the disclosed techniques to provide mobile user identity and/or SIM-based IoT identity based security (e.g., in combination with Application-ID using a NGFW) to user devices (e.g., mobile devices of subscribers that include a Subscriber Identity Module (SIM) card or an Embedded-SIM/Embedded Universal Integrated Circuit Card (eUICC)) that connect to their mobile network using 3G, 4G, or 5G Radio Access Technology (RAT).

In one embodiment, the disclosed techniques for enhanced security in mobile networks for service providers include providing enhanced security in mobile networks for service providers using a mobile user identity and Application-ID. For example, mobile service providers can apply the disclosed techniques to provide enhanced security to user devices (e.g., mobile devices of subscribers) and/or IoT devices that connect to their mobile network using 3G, 4G, or 5G Radio Access Technology (RAT) based on a mobile user identity and/or SIM-based IoT identity (e.g., International Mobile Subscriber Identity (IMSI) or other mobile user identifier) and Application-ID (e.g., an Application-ID can be determined by a security platform monitoring tunneled user traffic that is inspected using DPI techniques implemented by a NGFW as further described below).

In one embodiment, mobile service providers can apply the disclosed techniques to provide new and enhanced security services using a mobile user identity and/or using a mobile user identity and Application-ID. For example, mobile service providers can apply the disclosed techniques to provide a firewall service using a mobile user identity (e.g., IMSI or other mobile user identity) and Application-ID. As another example, mobile service providers can apply the disclosed techniques to provide a threat detection service using a mobile user identity and Application-ID (e.g., a mobile user identity based, basic threat detection service for known threats, a mobile user identity based, advanced threat detection service for unknown threats, and/or other threat detection services that can utilize mobile user identity based information to apply security policies). As yet another example, mobile service providers can apply the disclosed techniques to provide a threat prevention service for known threats using a mobile user identity and Application-ID (e.g., a mobile user identity based, basic threat prevention service for known threats, a mobile user identity based, advanced threat prevention service for unknown threats, and/or other threat prevention services that can utilize mobile user identity based information to apply security policies). As an additional example, mobile service providers can apply the disclosed techniques to provide a URL filtering service using a mobile user identity and Application-ID. As a further example, mobile service providers can apply the disclosed techniques to provide an application Denial of Service (DoS) detection service for DoS attacks using a mobile user identity and Application-ID. As another example, mobile service providers can apply the disclosed techniques to provide an application Denial of Service (DoS) prevention service for DoS attacks using a mobile user identity and Application-ID.

As similarly described above, GPRS Tunneling Protocol (GTP) is a group of IP-based communication protocols used on various interfaces within the Global System for Mobile Communication (GSM), Universal Mobile Telecommunications System (UMTS), and Long Term Evolution (LTE) network. GTPv1-C and GTPv2-C are used in today's mobile networks (e.g., GTPv1-C and GTPv2-C are generally used in today's 3G and 4G/LTE mobile networks, respectively).

In one embodiment, the disclosed techniques for enhanced security in mobile networks for service providers include performing mobile user identity and/or SIM-based IoT identity based security in mobile networks using a security platform that can implement security policies based on mobile user identity and/or SIM-based IoT identity information and Application-ID. For example, a security platform can monitor GTP-C traffic in a mobile network and process (e.g., parse) GTP-C messages to extract mobile user identity and/or SIM-based IoT identity (e.g., mobile user identifier information, such as IMSI, can be extracted from a Create PDP Request message in a 3G mobile network or a Create Session Request message in a 4G mobile network).

In one embodiment, a security platform is configured to extract mobile user identity information (e.g., IMSI) from a GTPv1-C Create PDP Request (e.g., in a 3G mobile network). In one embodiment, a security platform is configured to extract mobile user identity information (e.g., IMSI) from a GTPv2-C Create Session (e.g., in a 4G mobile network).

For example, a GTPv2-C Create Session Request message can generally be sent by various network elements in a mobile network (e.g., Serving Gateway (SGW), Mobility Management Entity (MME), and/or other network elements in the mobile network) as similarly described herein with respect to FIG. 2B. Also, such a Request message can generally be sent on various interfaces (e.g., S11, S5/S8, S4, and/or other interfaces in the mobile network as part of many procedures, such as an E-UTRAN initial attach, UE requested PDN connectivity, PDP content activation, handover from trusted or untrusted non-3GPP IP access to E-UTRAN, and/or other procedures). The IMSI Information Element (IE) is generally present in a GTPv2-C Create Session Request message as specified in 3GPP TS 29.274.

As another example, the security platform can extract mobile user identity information (e.g., IMSI) from GTPv1-C Create PDP Request messages, which are generally sent from an SGSN node to a GGSN node as a part of the GPRS PDP Context Activation procedure as similarly described herein with respect to FIG. 2A.

Accordingly, the disclosed techniques for enhanced security in mobile networks for service providers include performing security in mobile networks using a security platform that can implement security policies (e.g., for users/subscribers of the mobile network) based on IMSI and Application-ID. In addition, the disclosed techniques for enhanced security in mobile networks for service providers include performing security in mobile networks using a security platform that can implement security policies (e.g., for mobile devices and/or IoT devices that include a SIM or embedded SIM) based on IMSI and Application-ID.

In one embodiment, the security platform can extract mobile user identity information (e.g., IMSI) to perform security based on a security policy that can be applied based on the mobile user identity information. In one embodiment, the security platform can extract mobile user identity information (e.g., IMSI) and perform DPI to identify an Application-ID to perform security based on a security policy that can be applied based on the mobile user identity information and Application-ID.

In one embodiment, the security platform can extract mobile user identity information (e.g., IMSI) and perform DPI to identify an Application-ID to perform security based on a security policy that can be applied based on the mobile user identity information and Application-ID. For example, the security platform can perform threat detection by applying a security policy per IMSI and Application-ID in mobile and converged networks using the disclosed techniques. As another example, the security platform can perform threat prevention by applying a security policy per IMSI and Application-ID in mobile and converged networks using the disclosed techniques. As yet another example, the security platform can perform URL filtering by applying a security policy per IMSI and Application-ID in mobile and converged networks using the disclosed techniques. Example use case scenarios for enhanced security that can be performed on mobile networks for service providers using such mobile user identity information (e.g., IMSI) and Application-ID are further described below (e.g., a service provider can block access to a resource, such as a device or application for the device, based on mobile user identity information as further described below).

As will now be apparent to those of ordinary skill in the art, mobile service providers (e.g., service providers of mobile networks, service providers of mobile devices or IoTs, security service providers, or other entities that provide devices/services associated with using mobile networks) can provide each of these mobile user identity based firewall services or combinations thereof as well as various other mobile user identity based services using the disclosed techniques. Also, mobile service providers can apply the disclosed techniques to provide such using a mobile user identity based firewall services in combination with various other enhanced security services, such as location based, mobile device identifier based, RAT based, and/or combinations thereof, as further described below.

These and other techniques for providing enhanced security in mobile networks for service providers based on mobile user identity information and Application-ID (e.g., and/or other DPI and/or NGFW techniques, such as user ID, content ID, URL filtering, etc.) will be further described below.

Techniques for Radio Access Technology Based Security Enforcement in Mobile Networks for Service Providers In one embodiment, the disclosed techniques for enhanced security in mobile networks for service providers include providing a Radio Access Technology (RAT) based security in mobile networks for service providers. For example, mobile service providers can apply the disclosed techniques to provide RAT based security (e.g., in combination with Application-ID using a NGFW) to user devices that connect to their mobile network using 3G, 4G, or 5G Radio Access Technology (RAT).

In one embodiment, the disclosed techniques for enhanced security in mobile networks for service providers include providing RAT based security in mobile networks for service providers. For example, mobile service providers can apply the disclosed techniques to provide RAT based security to user devices (e.g., mobile devices of subscribers) and/or IoT devices that connect to their mobile network using 3GPP RAT or non-3GPP RAT.

In one embodiment, mobile service providers can apply the disclosed techniques to provide new and enhanced security services based on RAT. For example, mobile service providers can apply the disclosed techniques to provide a RAT based firewall service. As another example, mobile service providers can apply the disclosed techniques to provide a threat detection service using RAT information (e.g., a RAT based, basic threat detection service for known threats, a RAT based, advanced threat detection service for unknown threats, and/or other threat detection services that can utilize RAT based information to apply security policies). As yet another example, mobile service providers can apply the disclosed techniques to provide a threat prevention service for known threats using RAT information (e.g., a RAT based, basic threat prevention service for known threats, a RAT based, advanced threat prevention service for unknown threats, and/or other threat prevention services that can utilize RAT based information to apply security policies). As an additional example, mobile service providers can apply the disclosed techniques to provide a URL filtering service using RAT information.

As similarly described above, GPRS Tunneling Protocol (GTP) is a group of IP-based communication protocols used on various interfaces within the Global System for Mobile Communication (GSM), Universal Mobile Telecommunications System (UMTS), and Long Term Evolution (LTE) network. GTPv1-C and GTPv2-C are used in today's mobile networks (e.g., GTPv1-C and GTPv2-C are generally used in today's 3G and 4G/LTE mobile networks, respectively).

In one embodiment, the disclosed techniques for enhanced security in mobile networks for service providers include performing RAT based security in mobile networks using a security platform that can implement security policies based on RAT information. For example, a security platform can monitor GTP-C traffic in a mobile network and process (e.g., parse) GTP-C messages to extract RAT information.

In one embodiment, a security platform is configured to extract RAT information from a GTPv2-C Create Session (e.g., in a 4G mobile network). For example, a GTPv2-C Create Session Request message can generally be sent by various network elements in a mobile network (e.g., Serving Gateway (SGW), Mobility Management Entity (MME), and/or other network elements in the mobile network) as similarly described herein with respect to FIG. 2B. Also, such a Create Session Request message can generally be sent on various interfaces (e.g., S11, S5/S8, S4, and/or other interfaces in the mobile network as part of many procedures, such as an E-UTRAN initial attach, UE requested PDN connectivity, PDP content activation, handover from trusted or untrusted non-3GPP IP access to E-UTRAN, and/or other procedures). The RAT Information Element (IE) is generally present in a GTPv2-C Create Session Request message as specified in 3GPP TS 29.274. For example, the RAT IE can be set to 3GPP access or to non-3GPP access that the User Equipment (UE) is using to attach to the mobile network.

In one embodiment, the disclosed techniques for enhanced security in mobile networks for service providers include performing RAT based security in mobile networks using a security platform that can implement security policies based on RAT information (e.g., RAT Types supported by GTPv2-C). Example RAT Types supported by GTPv2-C include the following: UTRAN (e.g., RAT Type value=1), GERAN (e.g., RAT Type value=2), WLAN (e.g., RAT Type value=3), GAN (e.g., RAT Type value=4), HSPA Evolution (e.g., RAT Type value=5), EUTRAN (WB-E-UTRAN) (e.g., RAT Type value=6), Virtual (e.g., RAT Type value=7), and EUTRAN-NB-IoT (e.g., RAT Type value=8).

In one embodiment, a security platform is configured to extract RAT information from a GTPv1-C Create PDP Request message (e.g., in a 3G mobile network). For example, the security platform can extract RAT information from GTPv1-C Create PDP Request messages, which are generally sent from an SGSN node to a GGSN node as a part of the GPRS PDP Context Activation procedure as similarly described herein with respect to FIG. 2A.

Accordingly, the disclosed techniques for enhanced security in mobile networks for service providers include performing security in mobile networks using a security platform that can implement security policies based on RAT information. In one embodiment, the security platform can extract RAT information to perform security based on a security policy that can be applied based on the RAT information. For example, the security platform can perform threat detection by applying a security policy per RAT Type in mobile and converged networks using the disclosed techniques. As another example, the security platform can perform threat prevention by applying a security policy per RAT Type in mobile and converged networks using the disclosed techniques. As yet another example, the security platform can perform URL filtering by applying a security policy per RAT Type in mobile and converged networks using the disclosed techniques. Example use case scenarios for enhanced security that can be performed on mobile networks for service providers using RAT information are further described below (e.g., a Tier-1 cellular/mobile service provider that leases 3G (but not 4G) cellular/mobile network access to a Tier-2 service provider can configure the disclosed security platform to utilize RAT information to allow access to their 3G network for users/subscribers to the Tier-2 cellular/mobile service provider but restrict/not allow access to their 4G network for such users/subscribers, such as further described below).

As will now be apparent to those of ordinary skill in the art, mobile service providers (e.g., service providers of mobile networks, service providers of mobile devices or IoTs, security service providers, or other entities that provide devices/services associated with using mobile networks) can provide each of these RAT based firewall services or combinations thereof as well as various other RAT based services using the disclosed techniques. Also, mobile service providers can apply the disclosed techniques to provide such using RAT based firewall services in combination with various other enhanced security services, such as location based, mobile device identifier based, mobile user identifier based, and/or combinations thereof, as further described below.

These and other techniques for providing enhanced security in mobile networks for service providers based on RAT information (e.g., and/or in combination with various DPI and/or NGFW techniques, such as Application-ID, user ID, content ID, URL filtering, etc.) will be further described below.

Figure 4A:
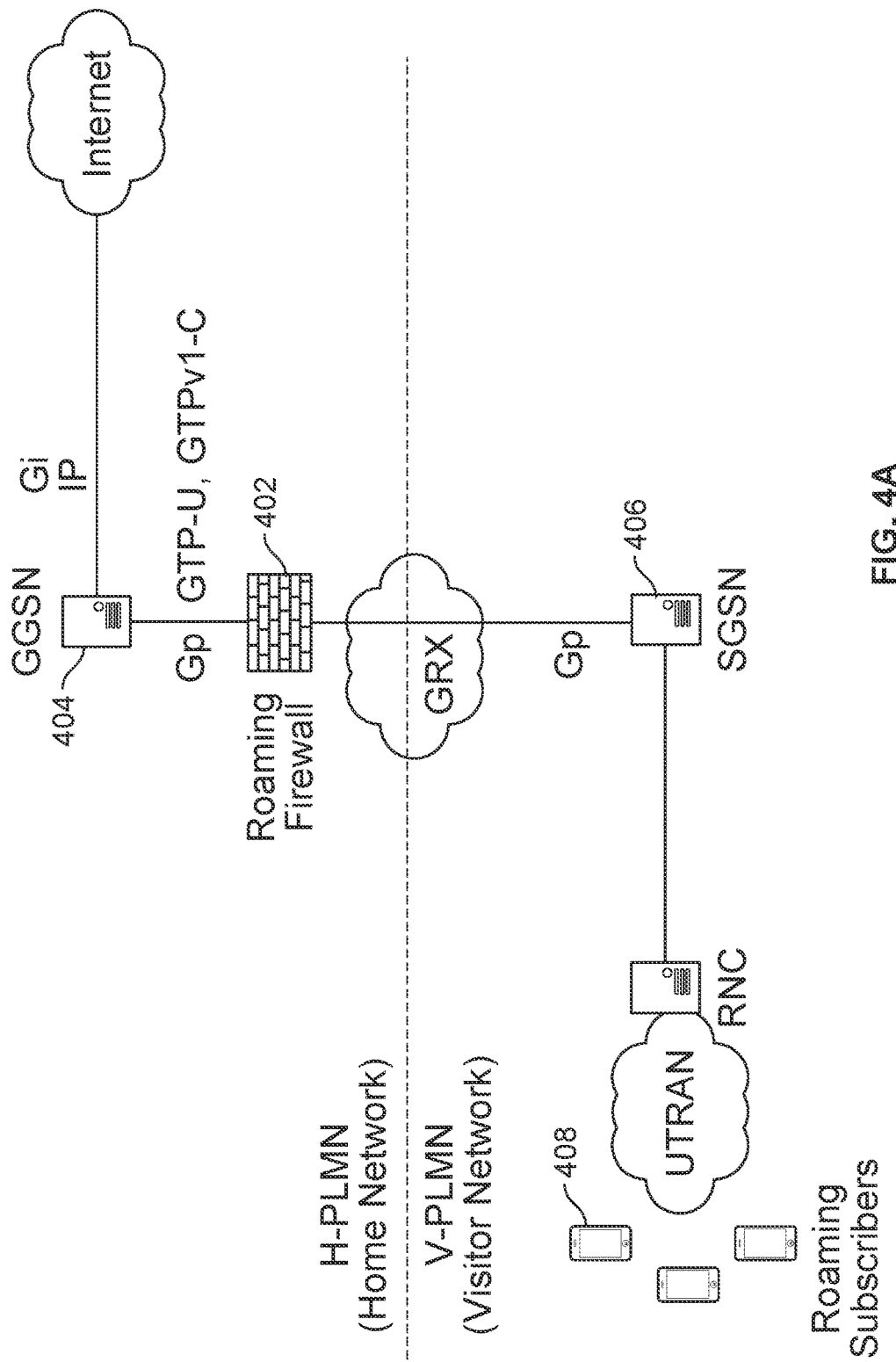
FIG. 4A is an example use case of providing enhanced security for roaming access in a 3G network in accordance with some embodiments.

Example Use Cases of Enhanced Security for Mobile/Service Provider Networks Using a Security Platform for Security Policy Enforcement FIG. 4A is an example use case of providing enhanced security for roaming access in a 3G network in accordance with some embodiments. Specifically, FIG. 4A shows a network placement of a security platform, shown as a Roaming Firewall 402, between a GGSN 404 and an SGSN 406 in a 3G network.

Referring to FIG. 4A, a Create PDP Request message (e.g., and/or other control/signaling messages) for a roaming subscriber, shown as Roaming Subscribers 408, sent from SGSN 406 to GGSN 404 using the Gp interface and the GTPv1-C protocol (e.g., and/or tunneled user data communications using the GTP-U protocol) can be monitored using Roaming Firewall 402 as shown. For example, various security policies can be enforced by Roaming Firewall 402 based on parameters/information extracted from such GTPv1-C messages and/or user data communications in GTP-U traffic using the disclosed techniques (e.g., roaming subscribers generally can have a distinct security policy enforced that is different than a security policy enforced for non-roaming subscribers, roaming subscribers may have access restricted based on RAT Type, roaming subscribers may have access restricted based on RAT Type and Application-ID (and/or other DPI determined information, such as Content-ID, User-ID, URL, etc.), and/or various other security policies can be enforced).

Figure 4B:
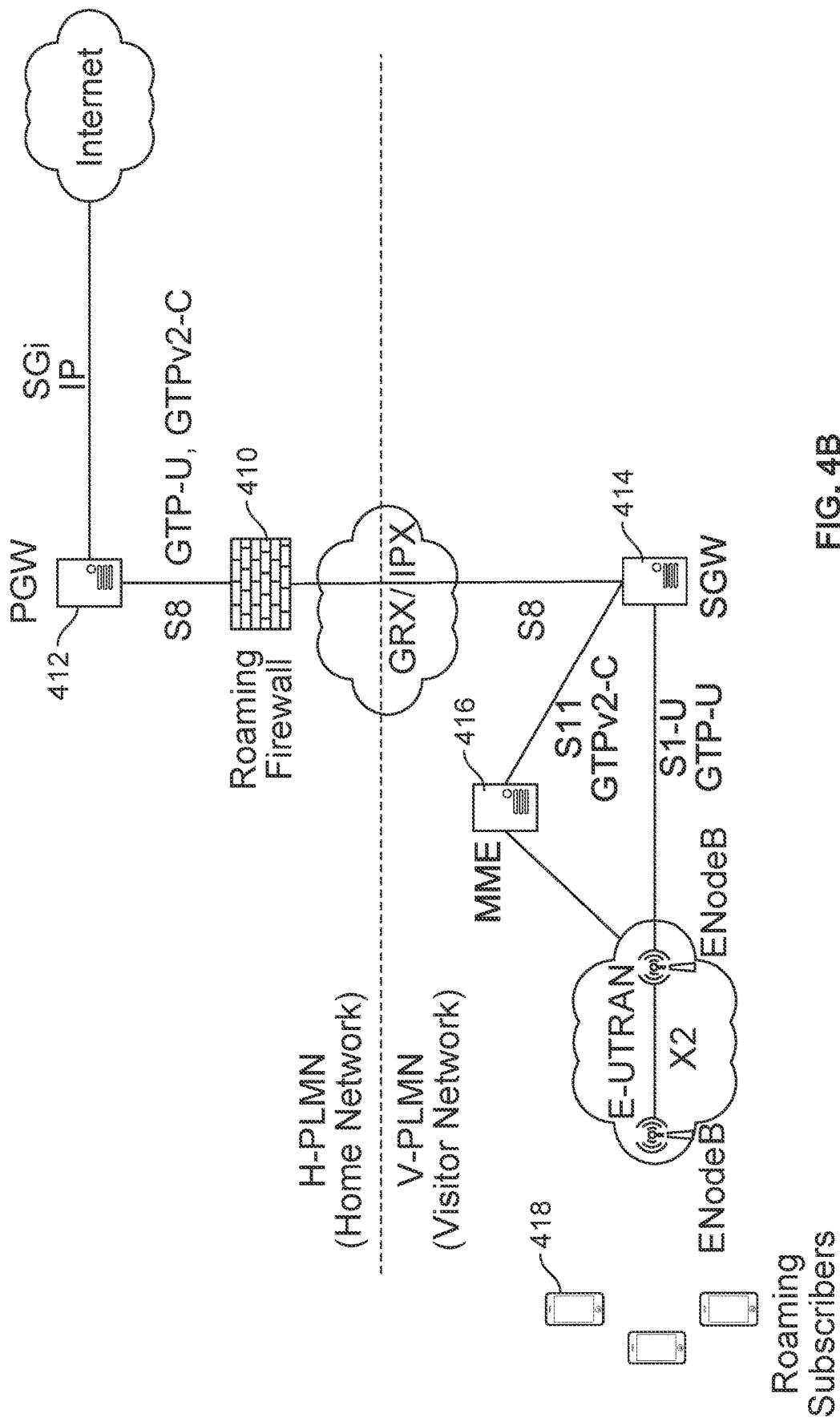
FIG. 4B is an example use case of providing enhanced security for roaming access in a 4G/LTE network in accordance with some embodiments.

FIG. 4B is an example use case of providing enhanced security for roaming access in a 4G/LTE network in accordance with some embodiments. Specifically, FIG. 4B shows a network placement of a security platform, shown as a Roaming Firewall 410, between a PGW 412 and an SGW 414 and MME 416 in a 4G/LTE network.

Referring to FIG. 4B, a Create Session Request message (e.g., and/or other control/signaling messages) for a roaming subscriber, shown as Roaming Subscribers 418, sent from MME 416 to SGW 414 using the S11 interface and then to PGW 412 using the S8 interface and the GTPv2-C protocol (e.g., and/or tunneled user data communications using the GTP-U protocol) can be monitored using Roaming Firewall 410 as shown. For example, various security policies can be enforced by Roaming Firewall 410 based on parameters/information extracted from such GTPv2-C messages and/or user data communications in GTP-U traffic using the disclosed techniques (e.g., roaming subscribers generally can have a distinct security policy enforced that is different than a security policy enforced for non-roaming subscribers, roaming subscribers may have access restricted based on RAT Type, roaming subscribers may have access restricted based on RAT Type and Application-ID (and/or other DPI determined information, such as Content-ID, User-ID, URL, etc.), and/or various other security policies can be enforced).

Figure 4C:
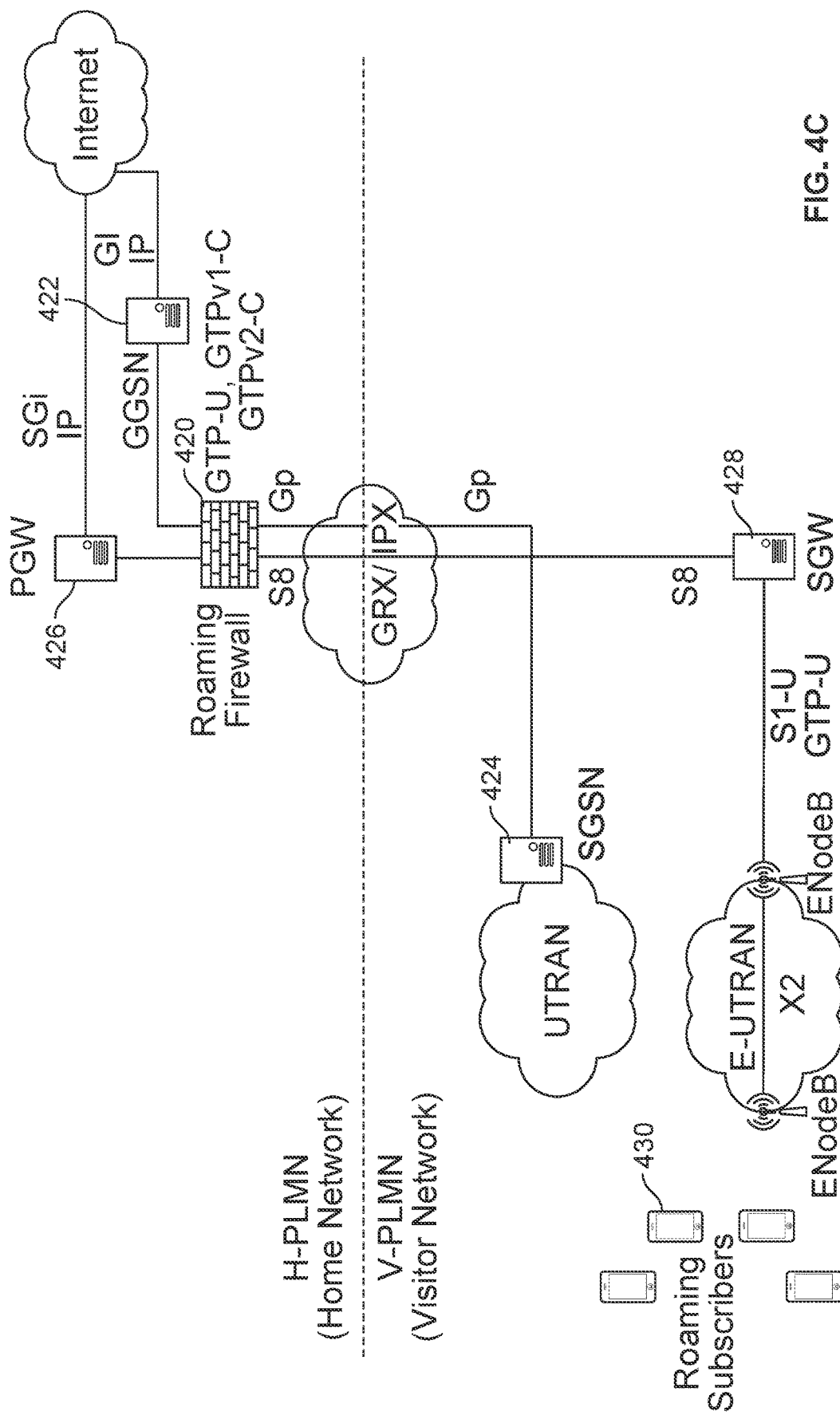
FIG. 4C is an example use case of providing enhanced security for roaming access in a mixed 3G and 4G/LTE network in accordance with some embodiments.

FIG. 4C is an example use case of providing enhanced security for roaming access in a mixed 3G and 4G/LTE network in accordance with some embodiments. Specifically, FIG. 4C shows a network placement of a security platform, shown as a Roaming Firewall 420, between a GGSN 422 and an SGSN 424 in a 3G network. FIG. 4C also shows a network placement of Roaming Firewall 420 between a PGW 426 and an SGW 428 in a 4G/LTE network.

Referring to FIG. 4C, a Create Session/PDP Request messages (e.g., and/or other control/signaling messages) for a roaming subscriber, shown as Roaming Subscribers 430, sent using the Gp/S8 interfaces and the GTPv1-C/GTPv2-C protocols (e.g., and/or tunneled user data communications using the GTP-U protocol) can be monitored using Roaming Firewall 420 as shown and as similarly described above. For example, various security policies can be enforced by Roaming Firewall 420 based on parameters/information extracted from such GTPv1-C/GTPv2-C messages and/or user data communications in GTP-U traffic using the disclosed techniques (e.g., roaming subscribers generally can have a distinct security policy enforced that is different than a security policy enforced for non-roaming subscribers, roaming subscribers may have access restricted based on RAT Type (such as roaming users may be restricted to only access the 3G network in the H-PLMN (Home Network) as shown in FIG. 4C), roaming subscribers may have access restricted based on RAT Type and Application-ID (and/or other DPI determined information, such as Content-ID, User-ID, URL, etc.), and/or various other security policies can be enforced).

Figure 4D:
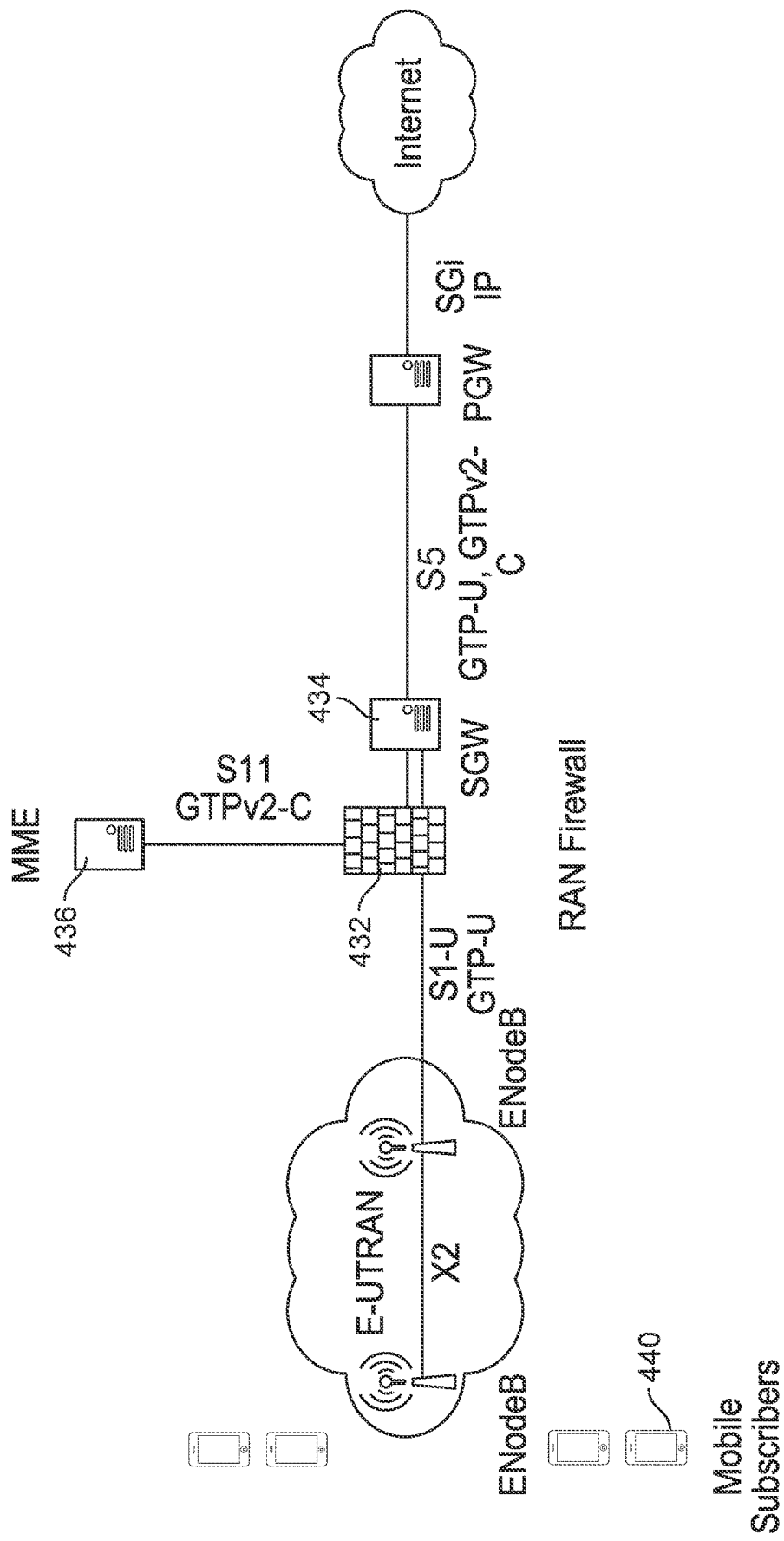
FIG. 4D is an example use case of providing enhanced security for mobile access in a 4G/LTE network in accordance with some embodiments.

FIG. 4D is an example use case of providing enhanced security for mobile access in a 4G/LTE network in accordance with some embodiments. Specifically, FIG. 4D shows a network placement of a security platform, shown as a RAN Firewall 432, between an SGW 434 and an MME 436 in a 4G/LTE network.

Referring to FIG. 4D, a Create Session Request message (e.g., and/or other control/signaling messages) for a mobile subscriber in a home network, shown as Mobile Subscribers 440, sent from MME 436 to SGW 434 using the S11 interface (e.g., and/or tunneled user data communications using the GTP-U protocol) can be monitored using RAN Firewall 432 as shown. For example, various security policies can be enforced by RAN Firewall 432 based on parameters/information extracted from such GTPv2-C messages and/or user data communications in GTP-U traffic using the disclosed techniques (e.g., mobile subscribers generally can have a distinct security policy enforced based on a location, device identifier, subscriber identity, and/or RAT associated with the mobile subscribers, mobile subscribers also generally can have a distinct security policy enforced based on a location, device identifier, subscriber identity, and/or RAT associated with the mobile subscribers in combination with Application-ID (and/or other DPI determined information, such as Content-ID, User-ID, URL, etc.), and/or various other security policies can be enforced).

Figure 4E:
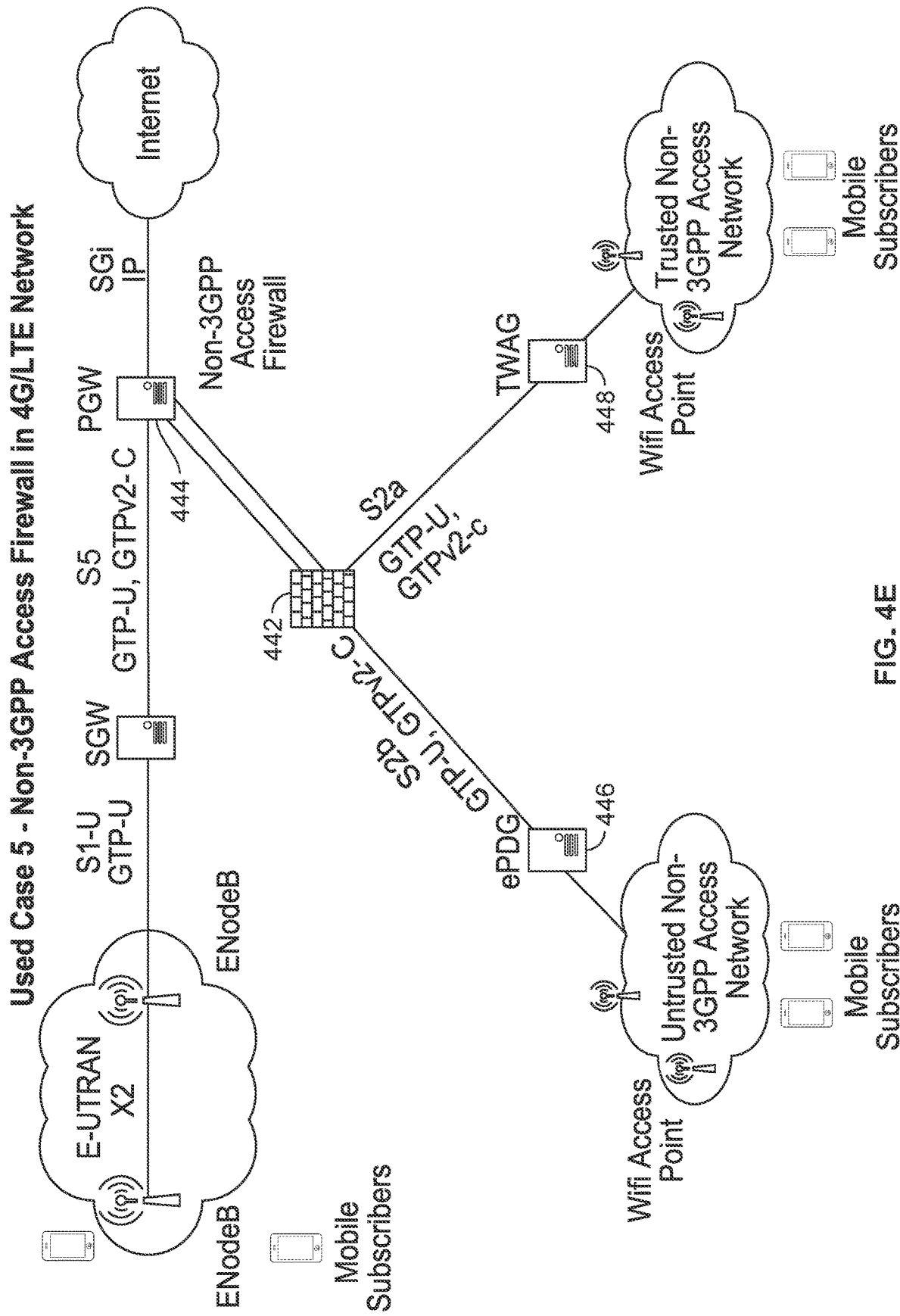
FIG. 4E is an example use case of providing enhanced security for non-3GPP access in a 4G/LTE network in accordance with some embodiments.

FIG. 4E is an example use case of providing enhanced security for non-3GPP access in a 4G/LTE network in accordance with some embodiments. Specifically, FIG. 4E shows a network placement of a security platform, shown as a Non-3GPP Access Firewall 442, between a between a PGW 444 and an evolved Packet Data Gateway (ePDG) 446 and a Trusted Wi-Fi Access Gateway (TWAG) 448 in a 4G/LTE network.

Referring to FIG. 4E, a Create Session Request message (e.g., and/or other control/signaling messages) for a mobile subscriber in an untrusted non-3GPP Access Network or from a mobile subscriber in a trusted 3GPP Access Network (e.g., and/or tunneled user data communications using the GTP-U protocol) can be monitored using Non-3GPP Access Firewall 442 as shown. For example, various security policies can be enforced by Non-3GPP Access Firewall 442 based on parameters/information extracted from such GTPv2-C messages and/or user data communications in GTP-U traffic using the disclosed techniques (e.g., mobile subscribers generally can have a distinct security policy enforced based on a location, device identifier, subscriber identity, and/or RAT associated with the mobile subscribers, mobile subscribers also generally can have a distinct security policy enforced based on a location, device identifier, subscriber identity, and/or RAT associated with the mobile subscribers in combination with Application-ID (and/or other DPI determined information, such as Content-ID, User-ID, URL, etc.), and/or various other security policies can be enforced).

Figure 4F:
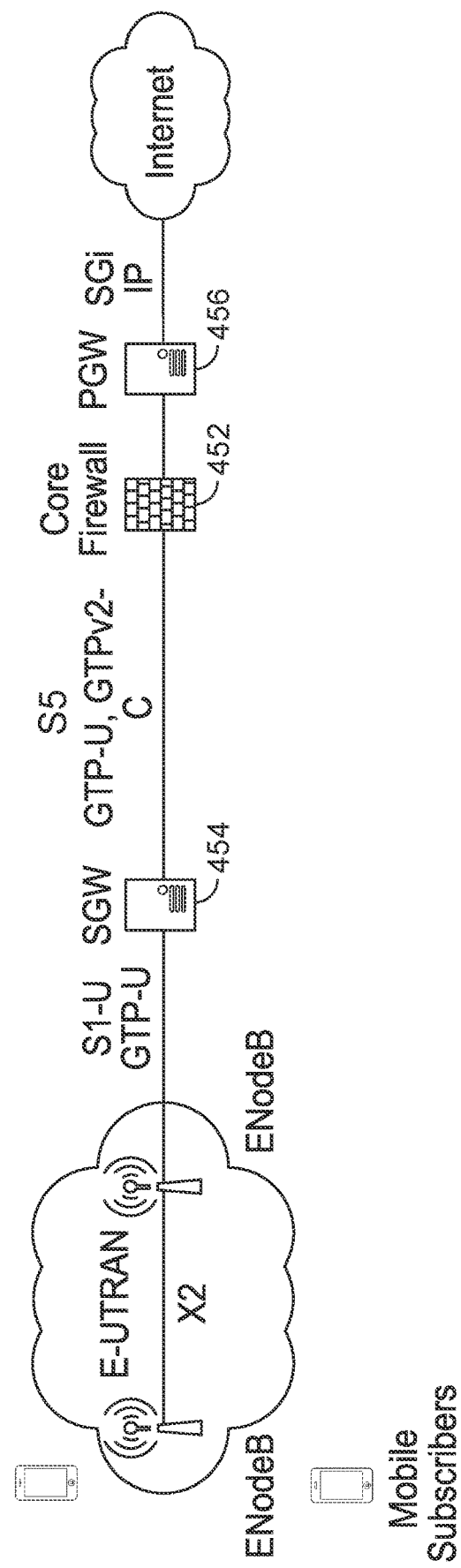
FIG. 4F is an example use case of providing enhanced security for mobile access using a core firewall in a 4G/LTE network in accordance with some embodiments.

FIG. 4F is an example use case of providing enhanced security for mobile access using a core firewall in a 4G/LTE network in accordance with some embodiments. Specifically, FIG. 4F shows a network placement of a security platform, shown as a Core Firewall 452, between a between a SGW 454 and a PGW 456 in a 4G/LTE network.

Referring to FIG. 4F, a Create Session Request message (e.g., and/or other control/signaling messages) for a mobile subscriber (e.g., and/or tunneled user data communications using the GTP-U protocol) can be monitored using Core Firewall 452 as shown. For example, various security policies can be enforced by Core Firewall 452 based on parameters/information extracted from such GTPv2-C messages and/or user data communications in GTP-U traffic using the disclosed techniques (e.g., mobile subscribers generally can have a distinct security policy enforced based on a location, device identifier, subscriber identity, and/or RAT associated with the mobile subscribers, mobile subscribers also generally can have a distinct security policy enforced based on a location, device identifier, subscriber identity, and/or RAT associated with the mobile subscribers in combination with Application-ID (and/or other DPI determined information, such as Content-ID, User-ID, URL, etc.), and/or various other security policies can be enforced).

Figure 4G:
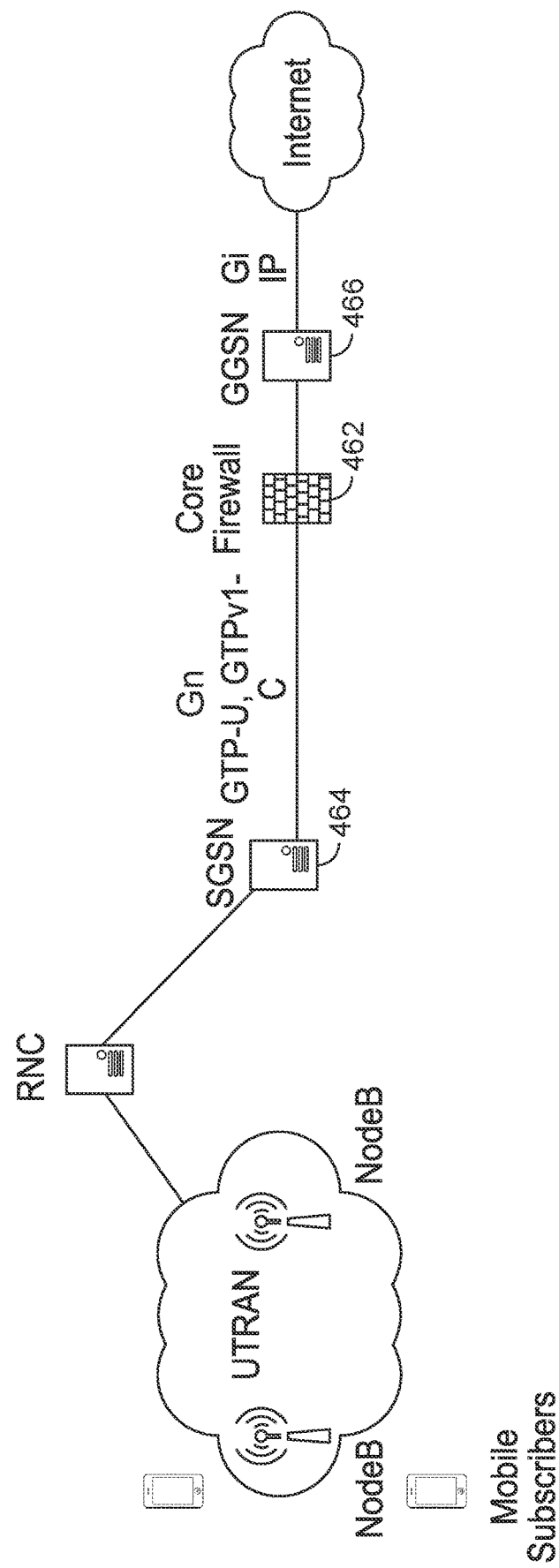
FIG. 4G is an example use case of providing enhanced security for mobile access using a core firewall in a 3G network in accordance with some embodiments.

FIG. 4G is an example use case of providing enhanced security for mobile access using a core firewall in a 3G network in accordance with some embodiments. Specifically, FIG. 4G shows a network placement of a security platform, shown as a Core Firewall 462, between a between a SGSN 464 and a GGSN 466 in a 3G network.

Referring to FIG. 4G, a Create Session Request message (e.g., and/or other control/signaling messages) for a mobile subscriber (e.g., and/or tunneled user data communications using the GTP-U protocol) can be monitored using Core Firewall 462 as shown. For example, various security policies can be enforced by Core Firewall 462 based on parameters/information extracted from such GTPv2-C messages and/or user data communications in GTP-U traffic using the disclosed techniques (e.g., mobile subscribers generally can have a distinct security policy enforced based on a location, device identifier, subscriber identity, and/or RAT associated with the mobile subscribers, mobile subscribers also generally can have a distinct security policy enforced based on a location, device identifier, subscriber identity, and/or RAT associated with the mobile subscribers in combination with Application-ID (and/or other DPI determined information, such as Content-ID, User-ID, URL, etc.), and/or various other security policies can be enforced).

Additional Example Use Case Scenarios of Enhanced Security for Mobile/Service Provider Networks Using a Security Platform for Security Policy Enforcement The disclosed techniques for providing enhanced security for mobile/service provider networks using a security platform for security policy enforcement can be applied in a variety of additional example use case scenarios for facilitating enhanced and more flexible and dynamic security within mobile/service provider network environments. Additional example use case scenarios will be further described below.

As a first example use case scenario, assume that a subscriber, Alice, signs up for enhanced security through her mobile network service provider (e.g., AT&T®, T-Mobile®, Verizon®, or another service provider), and the security platform dynamically applies a new security policy based on Alice's subscriber identity (IMSI) and/or Alice's device identifiers (e.g., IMEI associated with Alice's mobile phone or her other device(s)). In addition, such security policy enforcement implemented for sessions associated with Alice and/or her devices on the mobile network controlled/managed by her service provider can include security policy enforcement based on other information/parameters, such as location and/or RAT, based on threat detection/prevention, URL filtering, Application-ID, Content-ID, and/or other DPI based security policy inspection/enforcement as similarly described above.

As a second example use case scenario, assume that control of one or more applications within an automobile (e.g., radio application, acceleration control, steering wheel control, brakes control) is hijacked by an unauthorized user/entity. In this scenario, the disclosed techniques can be applied by enforcing a security policy per automobile (e.g., based on the IMEI associated with the compromised/infected automobile), per user (e.g., based on IMSI), per location, and/or per application (e.g., based on the Application-ID). Specifically, a service provider can block the attack/control for specific applications per user (e.g., IMSI) and/or per the identifier of the automobile (e.g., IMEI) using a security platform that implements the disclosed techniques. For example, the security platform can detect that the automobile is infected, such as based on detecting Command and Control (C&C) traffic (e.g., using DPI based firewall techniques, such as by monitoring DNS requests from the automobile, and/or using other DPI based firewall techniques). As another example, the security platform can detect malware traffic directed towards the automobile (e.g., using DPI based firewall techniques, such as by performing URL filtering, identifying a Content-ID, and/or using other DPI based firewall techniques). The firewall can be configured to generate alerts, block/drop packets, or perform other actions including blocking a specific application (e.g., based on Application-ID and IMEI for the automobile, including for acceleration, steering, and brake applications but can allow a radio application to have Internet access, which can be configured as a blocking/whitelisting of applications and/or modify access privileges when suspicious/malware behavior is detected). As yet another example, if hacker hardware identity (IMEI) is determined to be attacking/targeting the automobile, then all GTP-C Create PDP/Session Messages can be blocked/dropped to disallow any communications from such an unauthorized entity (e.g., hacker/device being utilized by the hacker).

As a third example use case scenario, assume that a network accessible thermostat (e.g., an IoT thermostat) is hijacked by an unauthorized user/entity. In this scenario, the disclosed techniques can be applied by enforcing a security policy per thermostat (e.g., based on the IMEI associated with the compromised/infected thermostat), per user (e.g., based on IMSI), per location, and/or per application (e.g., based on the Application-ID). Specifically, a service provider can block the attack/control for specific applications per user (e.g., IMSI) and/or per identifier of the thermostat (e.g., IMEI) using a security platform that implements the disclosed techniques. For example, the security platform can detect that the thermostat is infected, such as based on detecting Command and Control (C&C) traffic (e.g., using DPI based firewall techniques, such as by monitoring DNS requests from the automobile, and/or using other DPI based firewall techniques). As another example, the security platform can detect malware traffic directed towards the thermostat (e.g., using DPI based firewall techniques, such as by performing URL filtering, identifying a Content-ID, and/or using other DPI based firewall techniques). The firewall can be configured to generate alerts, block/drop packets, or perform other actions including blocking a specific application (e.g., based on Application-ID and IMEI for the thermostat, including for remote control of the temperature such as via Internet access, such that users can only manually change on the thermostat device dial itself but not via the Internet, which can be configured as a blocking of applications and/or modify access privileges when suspicious/malware behavior is detected). As yet another example, if hacker hardware identity (IMEI) is determined to be attacking/targeting the thermostat, then all GTP-C Create PDP/Session Messages can be blocked/dropped to disallow any communications from such an unauthorized entity (e.g., hacker/device being utilized by the hacker).

As a fourth example use case scenario, assume that a given location is subject to an emergency forest fire event, the security platform that implements the disclosed techniques can be configured to block all GTP-C Create PD/Session Messages based on location information/parameter(s) in that geographical area. For example, the blocking of such new GTP sessions in the geographical area of the emergency forest fire event can be used to prevent unauthorized/non-emergency personnel from flying drones that may interfere with the fire-fighting effort in the geographical area of the emergency forest fire event (e.g., as such may interfere with helicopter or airplane usage for fighting the fire or otherwise put emergency personnel/others at further risk).

In an example implementation, mobile network service providers and/or other service providers can use a table(s) (e.g., stored in a data plane of a security platform device, such as further described below) that can include a correlation of IMEI, IMSI, and IP address to implement such security policies in various use case scenarios. For example, for a home or office that has a plurality of IoT devices that are associated with a given IP address for the user's home or office network, the user can enter the respective IMSI for each of their IoT devices. In this example, a security policy can be implemented per IMSI (e.g., in addition to per IP address, as such would impact each of the user's home or office IoT devices as they are each associated with that user's same home IP address using NAT). As such, mobile network or other service providers can use the table to perform security policy using the above-described techniques.

As a fifth example use case scenario, assume that a network service provider (e.g., Small Cell Company, which is a tier-2 or tier-3 mobile operator company) leases network access from another network service provider (e.g., Large Cell Company, such as AT&T or Verizon, which is a tier-1 mobile operator company), then the Large Cell Company can utilize a security platform that performs the disclosed techniques to allow RATs and/or block RATs based on a security policy that corresponds to the lease agreement between Large Cell Company and Small Cell Company (e.g., Large Cell Company may have only leased 3G networks, but not 4G networks, to Small Cell Company). As another example, Large Cell Company may have only leased RAT access for IoT to Small Cell Company (e.g., a security policy can be specified for IoT access, in which applications and protocols that can be used on IoT (whitelisted) are specified in the security policy such that other protocols/applications can be blocked/filtered as not allowed (blacklisted)).

As will now be apparent in view of the disclosed embodiments, a network service provider/mobile operator (e.g., a cellular service provider entity), a device manufacturer (e.g., an automobile entity, IoT device entity, and/or other device manufacturer), and/or system integrators can specify such security policies that can be enforced by a security platform using the disclosed techniques to solve these and other technical network security challenges.

Figure 5:
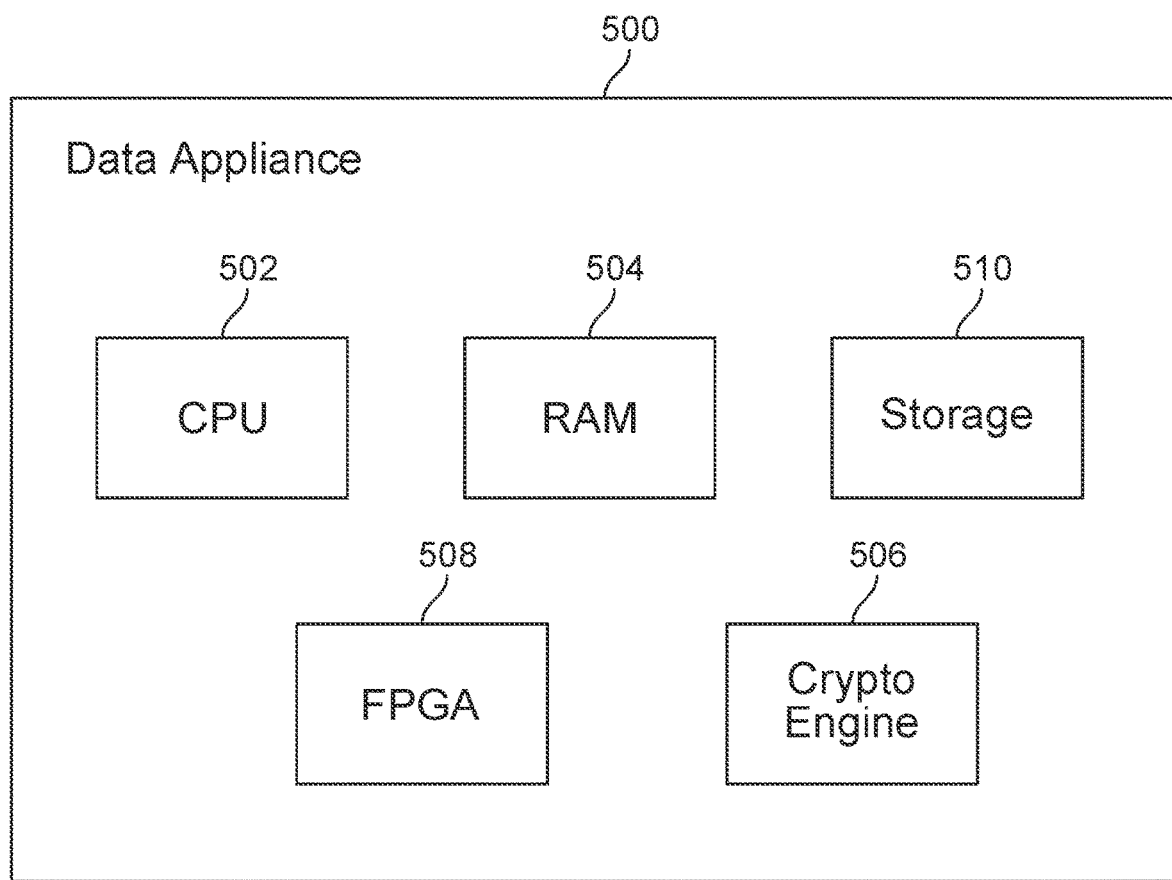
FIG. 5 is a functional diagram of hardware components of a network device for performing security policy enforcement on mobile/service provider network environments in accordance with some embodiments.

Example Hardware Components of a Network Device for Performing Security Policy Enforcement on Mobile/Service Provider Network Environments FIG. 5 is a functional diagram of hardware components of a network device for performing security policy enforcement on mobile/service provider network environments in accordance with some embodiments. The example shown is a representation of physical/hardware components that can be included in network device 500 (e.g., an appliance, gateway, or server that can implement the security platform disclosed herein). Specifically, network device 500 includes a high performance multi-core CPU 502 and RAM 504. Network device 500 also includes a storage 510 (e.g., one or more hard disks or solid state storage units), which can be used to store policy and other configuration information as well as signatures. In one embodiment, storage 510 stores location information, hardware identifier information, subscriber identity information, and/or RAT information and associated IP addresses and possibly other information (e.g., Application-ID, Content-ID, User-ID, URL, and/or other information) that are monitored for implementing the disclosed security policy enforcement techniques using a security platform/firewall device. Network device 500 can also include one or more optional hardware accelerators. For example, network device 500 can include a cryptographic engine 506 configured to perform encryption and decryption operations, and one or more FPGAs 508 configured to perform signature matching, act as network processors, and/or perform other tasks.

Figure 6:
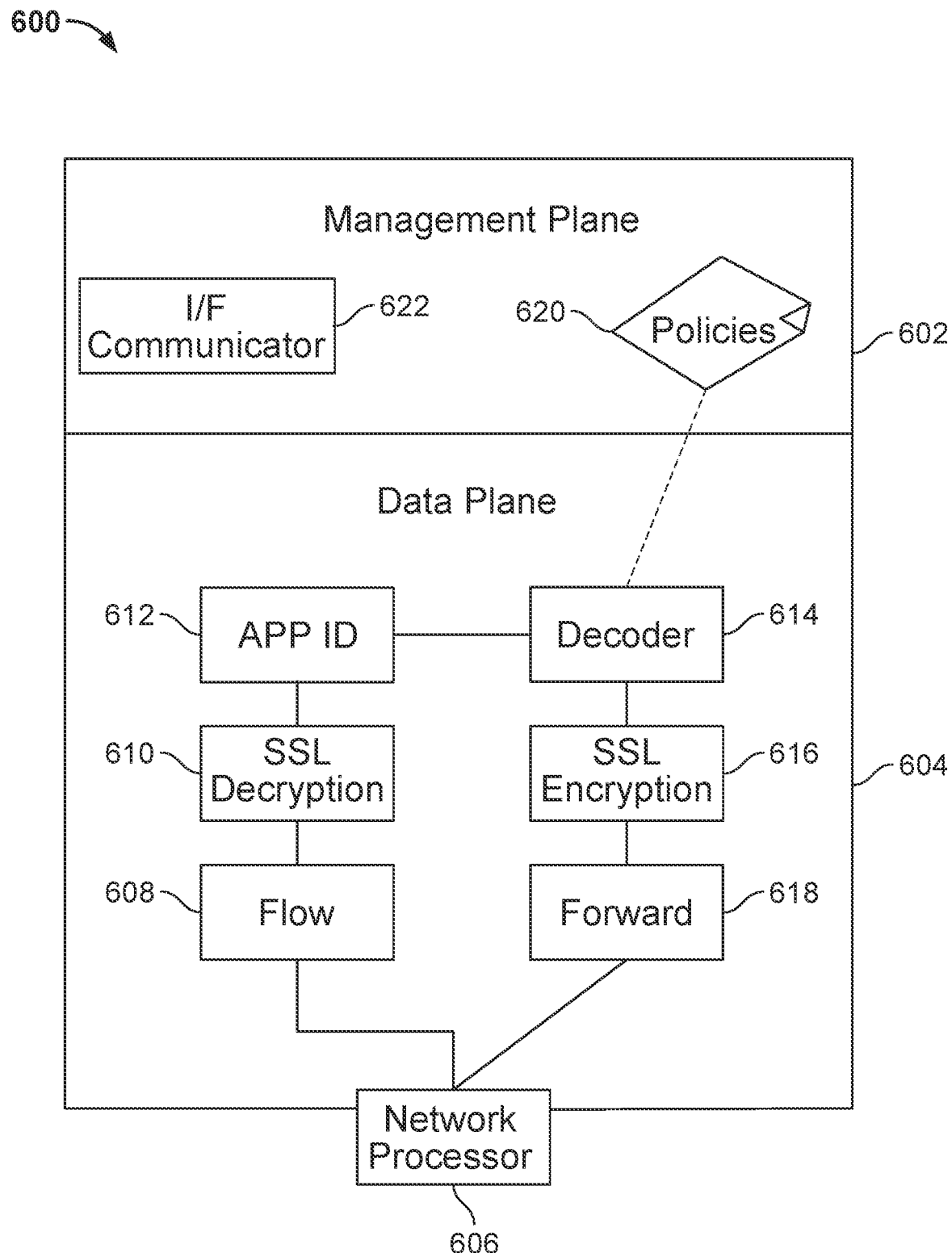
FIG. 6 is a functional diagram of logical components of a network device for performing security policy enforcement on mobile/service provider network environments in accordance with some embodiments.

Example Logical Components of a Network Device for Performing Security Policy Enforcement on Mobile/Service Provider Network Environments FIG. 6 is a functional diagram of logical components of a network device for performing security policy enforcement on mobile/service provider network environments in accordance with some embodiments. The example shown is a representation of logical components that can be included in network device 600 (e.g., a data appliance, which can implement the disclosed security platform and perform the disclosed techniques). As shown, network device 600 includes a management plane 602 and a data plane 604. In one embodiment, the management plane is responsible for managing user interactions, such as by providing a user interface for configuring policies and viewing log data. The data plane is responsible for managing data, such as by performing packet processing and session handling.

Suppose a mobile device attempts to access a resource (e.g., a remote web site/server, an IoT device, or another resource) using an encrypted session protocol, such as SSL. Network processor 606 is configured to monitor packets from the mobile device, and provide the packets to data plane 604 for processing. Flow 608 identifies the packets as being part of a new session and creates a new session flow. Subsequent packets will be identified as belonging to the session based on a flow lookup. If applicable, SSL decryption is applied by SSL decryption engine 610 using various techniques as described herein. Otherwise, processing by SSL decryption engine 610 is omitted. Application identification (APP ID) module 612 is configured to determine what type of traffic the session involves and to identify a user associated with the traffic flow (e.g., to identify an Application-ID as described herein). For example, APP ID 612 can recognize a GET request in the received data and conclude that the session requires an HTTP decoder. As another example, APP ID 612 can recognize a Create Session Request or a Create PDP Request in the received data and conclude that the session requires a GTP decoder. For each type of protocol, there exists a corresponding decoder 614. In one embodiment, the application identification is performed by an application identification module (e.g., APP-ID component/engine), and a user identification is performed by another component/engine. Based on the determination made by APP ID 612, the packets are sent to an appropriate decoder 614. Decoder 614 is configured to assemble packets (e.g., which may be received out of order) into the correct order, perform tokenization, and extract out information. Decoder 614 also performs signature matching to determine what should happen to the packet. SSL encryption engine 616 performs SSL encryption using various techniques as described herein and the packets are then forwarded using a forward component 618 as shown. As also shown, policies 620 are received and stored in the management plane 602. In one embodiment, policy enforcement (e.g., policies can include one or more rules, which can be specified using domain and/or host/server names, and rules can apply one or more signatures or other matching criteria or heuristics, such as for security policy enforcement for subscriber/IP flows on service provider networks based on various extracted parameters/information from monitored GTP-C messages and/or DPI of monitored GTP-U traffic as disclosed herein) is applied as described herein with respect to various embodiments based on the monitored, decrypted, identified, and decoded session traffic flows.

As also shown in FIG. 6, an interface (I/F) communicator 622 is also provided for security platform manager communications (e.g., via (REST) APIs, messages, or network protocol communications or other communication mechanisms). In some cases, network communications of other network elements on the service provider network are monitored using network device 600, and data plane 604 supports decoding of such communications (e.g., network device 600, including I/F communicator 622 and decoder 614, can be configured to monitor and/or communicate on, for example, Gn, Gp, SGi, Gi, S1, S5, S8, S11, and/or other interfaces where wired and wireless network traffic flow exists as similarly described herein). As such, network device 600 including I/F communicator 622 can be used to implement the disclosed techniques for security policy enforcement on mobile/service provider network environments as described above and as will be further described below.

Additional example processes for the disclosed techniques for performing security policy enforcement on mobile/service provider network environments will now be described.

Figure 7:
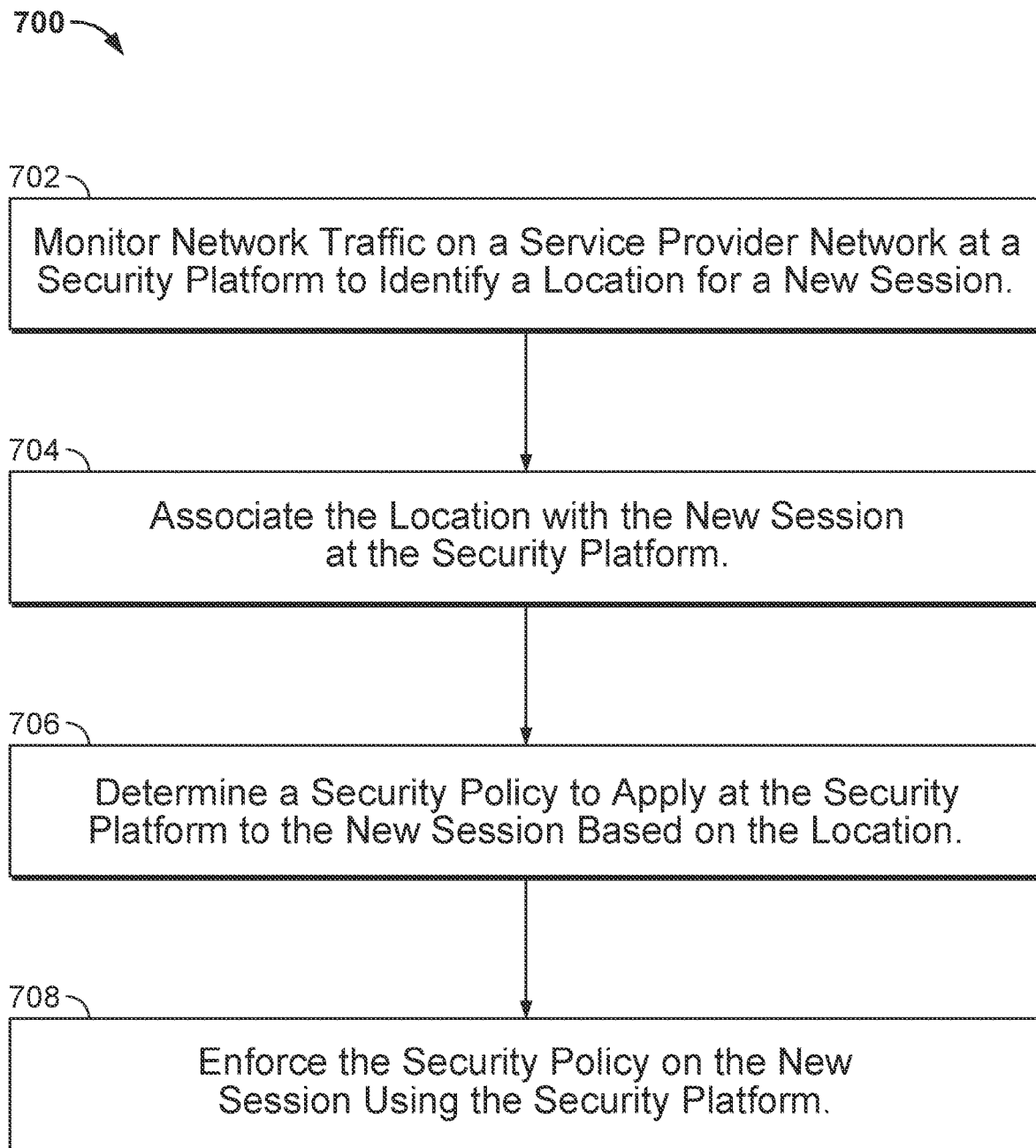
FIG. 7 is a flow diagram of a process for performing location based security in mobile networks for service providers in accordance with some embodiments.

Example Processes for Location Based Security in Mobile Networks for Service Providers FIG. 7 is a flow diagram of a process for performing location based security in mobile networks for service providers in accordance with some embodiments. In some embodiments, a process 700 as shown in FIG. 7 is performed by the security platform and techniques as similarly described above including the embodiments described above with respect to FIGS. 1A-6. In one embodiment, process 700 is performed by data appliance 500 as described above with respect to FIG. 5, network device 600 as described above with respect to FIG. 6, a virtual appliance, an SDN security solution, a cloud security service, and/or combinations or hybrid implementations of the aforementioned as described herein.

The process begins at 702. At 702, monitoring network traffic on a service provider network at the security platform to identify a location for a new session is performed. For example, the security platform (e.g., a firewall, a network sensor acting on behalf of the firewall, or another device/component that can implement security policies) can extract location information/parameters from GTP-C traffic on the mobile core network as similarly described above.

At 704, associating the location with the new session at the security platform is performed. For example, the security platform can identify new IP sessions (e.g., data calls or other sessions) and associate the location and assigned IP address with the new flow (e.g., cached/stored in a table in a data plane of the security platform) as similarly described above.

At 706, determining a security policy to apply at the security platform to the new session based on the location is performed. For example, the security policy can be determined and/or enforced based on various combinations of location, hardware identifier, subscriber identity, and RAT information and/or based on information detected/determined using DPI based firewall techniques, such as by performing URL filtering, identifying an Application-ID, identifying a Content-ID, and/or using other DPI based firewall techniques as similarly described above.

At 708, enforcing the security policy on the new session using the security platform is performed. For example, various enforcement actions (e.g., allow/pass, block/drop, alert, tag, monitor, log, throttle, restrict access, and/or other enforcement actions) can be performed using the security platform as similarly described above.

Figure 8:
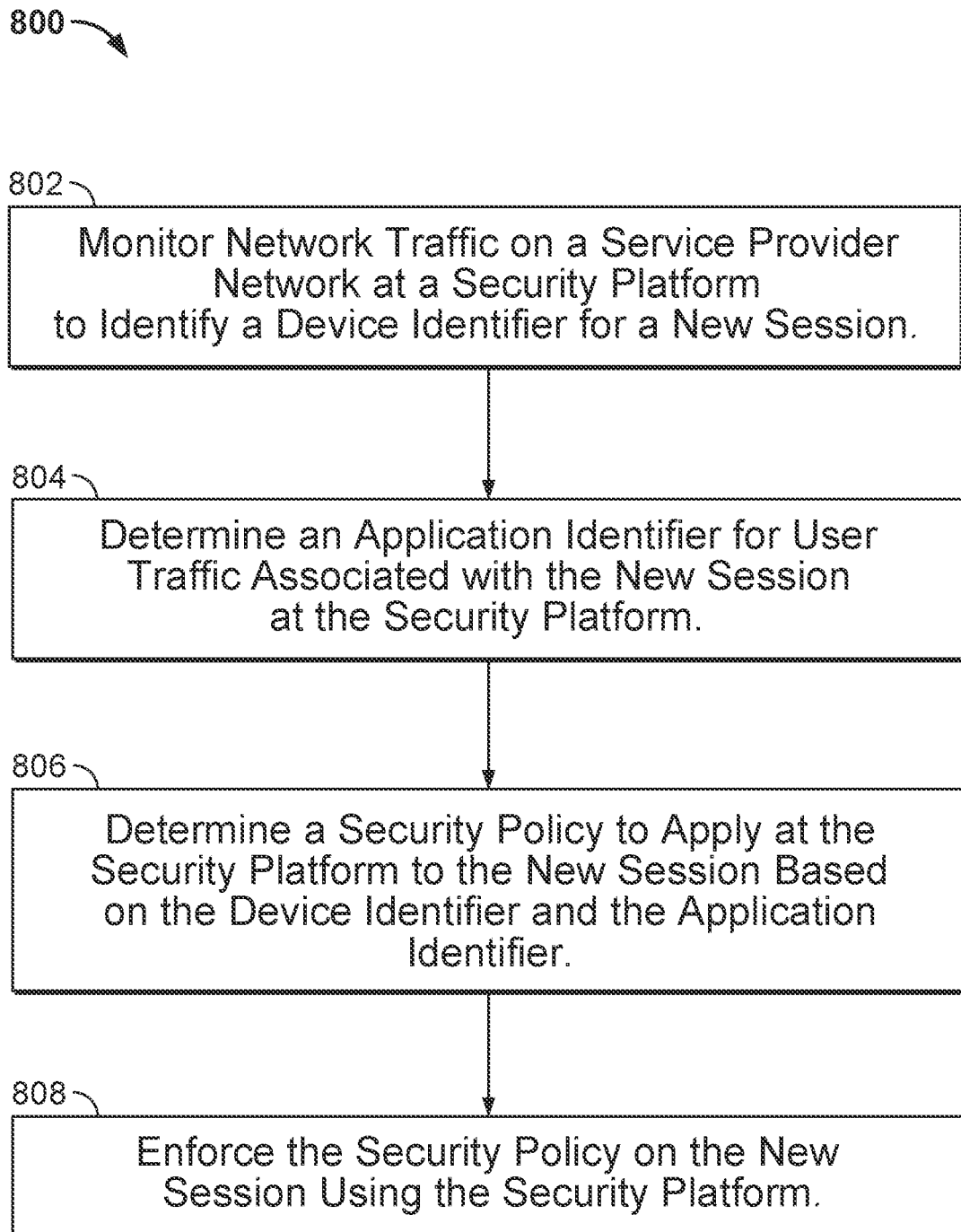
FIG. 8 is a flow diagram of a process for performing mobile equipment identity and/or IoT equipment identity and application identity based security enforcement for service providers in mobile networks in accordance with some embodiments.

Example Processes for Mobile Equipment Identity and/or IoT Equipment Identity and Application Identity Based Security Enforcement in Mobile Networks for Service Providers FIG. 8 is a flow diagram of a process for performing mobile equipment identity and/or IoT equipment identity and application identity based security enforcement for service providers in mobile networks in accordance with some embodiments. In some embodiments, a process 800 as shown in FIG. 8 is performed by the security platform and techniques as similarly described above including the embodiments described above with respect to FIGS. 1A-6. In one embodiment, process 800 is performed by data appliance 500 as described above with respect to FIG. 5, network device 600 as described above with respect to FIG. 6, a virtual appliance, an SDN security solution, a cloud security service, and/or combinations or hybrid implementations of the aforementioned as described herein.

The process begins at 802. At 802, monitoring network traffic on a service provider network at the security platform to identify a mobile equipment identity and/or IoT equipment identity for a new session is performed. For example, the security platform (e.g., a firewall, a network sensor acting on behalf of the firewall, or another device/component that can implement security policies) can extract mobile equipment identity and/or IoT equipment identity information/parameters (e.g., IMEI) from GTP-C traffic on the mobile core network as similarly described above.

At 804, determining an application identity (e.g., application identifier) for user traffic associated with the new session at the security platform is performed. For example, an application identifier (e.g., Application-ID) can be identified by monitoring GTP-U traffic using DPI based firewall techniques as similarly described above.

At 806, determining a security policy to apply at the security platform to the new session based on the mobile equipment identity and/or IoT equipment identity and application identity is performed. For example, the security policy can be determined and/or enforced based on various combinations of location, hardware identifier, subscriber identity, and RAT information and/or based on information detected/determined using DPI based firewall techniques, such as by performing URL filtering, identifying an Application-ID, identifying a Content-ID, and/or using other DPI based firewall techniques as similarly described above.

At 808, enforcing the security policy on the new session using the security platform is performed. For example, various enforcement actions (e.g., allow/pass, block/drop, alert, tag, monitor, log, throttle, restrict access, and/or other enforcement actions) can be performed using the security platform as similarly described above.

Figure 9:
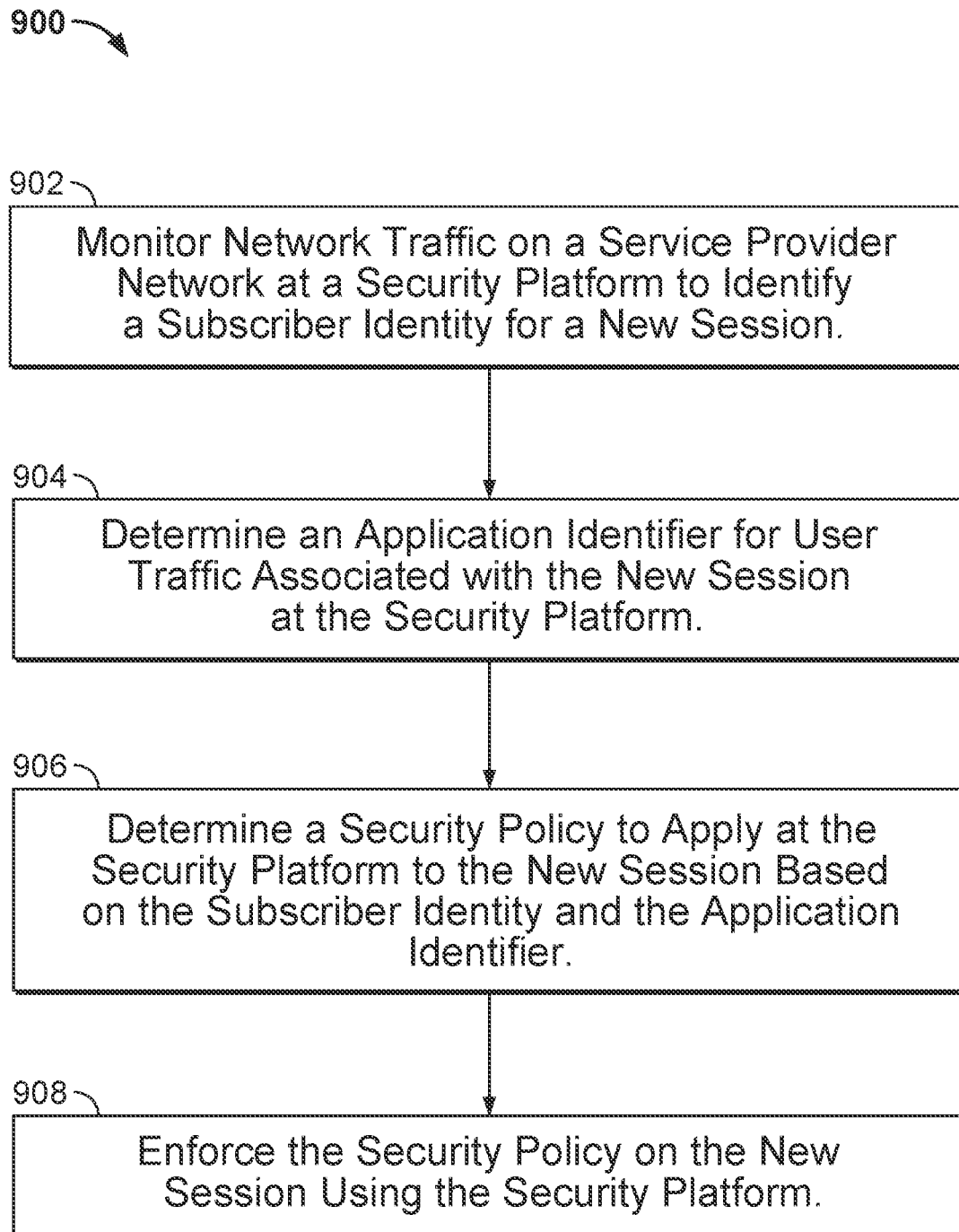
FIG. 9 is a flow diagram of a process for performing mobile user identity and/or SIM-based IoT identity and application identity based security enforcement for service providers in mobile networks in accordance with some embodiments.

Example Processes for Mobile User Identity and/or SIM-Based IoT Identity and Application Identity Based Security Enforcement in Mobile Networks for Service Providers FIG. 9 is a flow diagram of a process for performing mobile user identity and/or SIM-based IoT identity and application identity based security enforcement for service providers in mobile networks in accordance with some embodiments. In some embodiments, a process 900 as shown in FIG. 9 is performed by the security platform and techniques as similarly described above including the embodiments described above with respect to FIGS. 1A-6. In one embodiment, process 900 is performed by data appliance 500 as described above with respect to FIG. 5, network device 600 as described above with respect to FIG. 6, a virtual appliance, an SDN security solution, a cloud security service, and/or combinations or hybrid implementations of the aforementioned as described herein.

The process begins at 902. At 902, monitoring network traffic on a service provider network at the security platform to identify a subscriber identity and/or SIM-based IoT identity for a new session is performed. For example, the security platform (e.g., a firewall, a network sensor acting on behalf of the firewall, or another device/component that can implement security policies) can extract mobile user identity and/or SIM-based IoT identity information/parameters (e.g., IMSI) from GTP-C traffic on the mobile core network as similarly described above.

At 904, determining an application identity (e.g., application identifier) for user traffic associated with the new session at the security platform is performed. For example, an application identifier (e.g., Application-ID) can be identified by monitoring GTP-U traffic using DPI based firewall techniques as similarly described above.

At 906, determining a security policy to apply at the security platform to the new session based on the subscriber identity and the application identifier is performed. For example, the security policy can be determined and/or enforced based on various combinations of location, hardware identifier, subscriber identity, and RAT information and/or based on information detected/determined using DPI based firewall techniques, such as by performing URL filtering, identifying an Application-ID, identifying a Content-ID, and/or using other DPI based firewall techniques as similarly described above.

At 908, enforcing the security policy on the new session using the security platform is performed. For example, various enforcement actions (e.g., allow/pass, block/drop, alert, tag, monitor, log, throttle, restrict access, and/or other enforcement actions) can be performed using the security platform as similarly described above.

Figure 10:
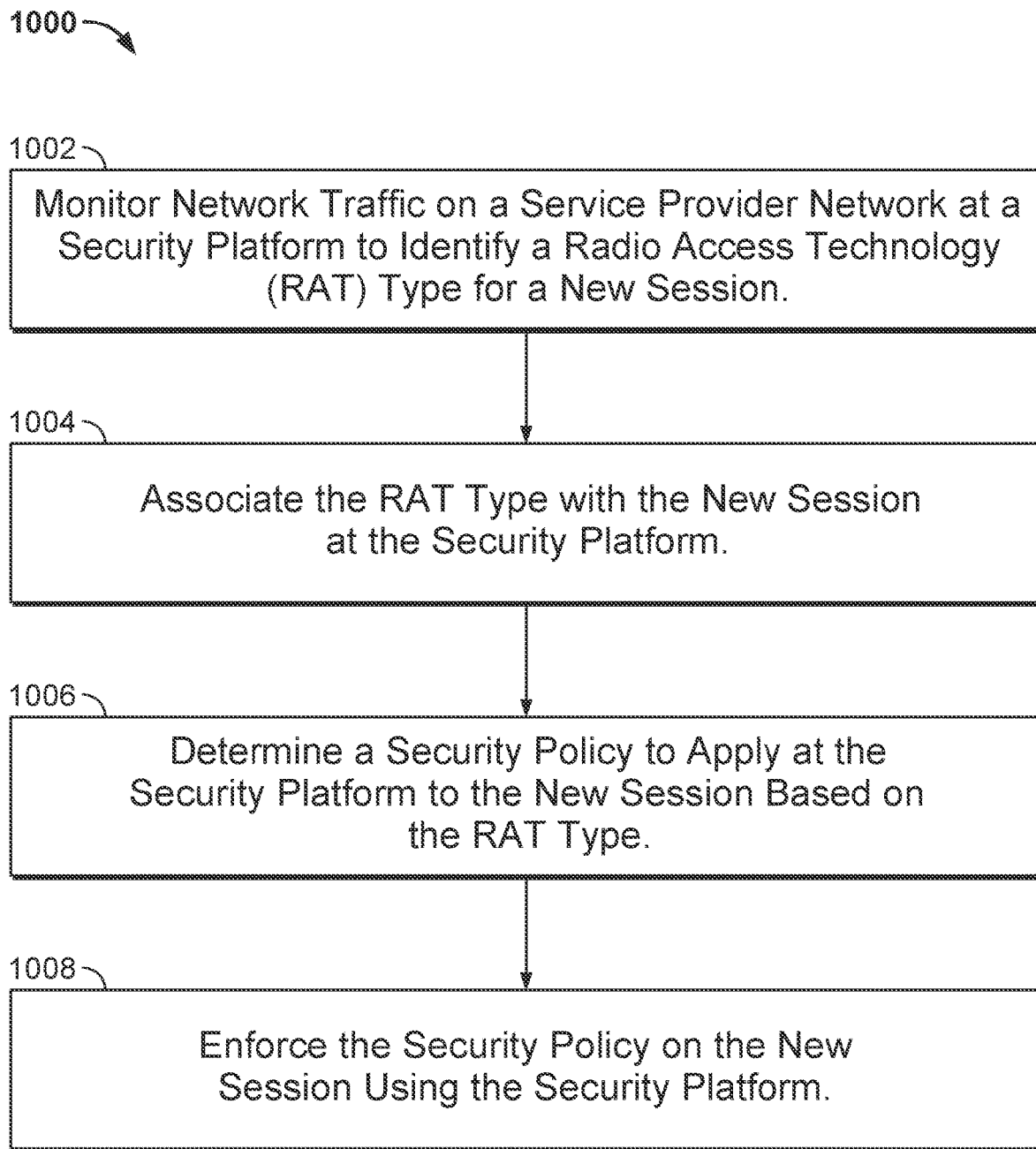
FIG. 10 is a flow diagram of a process for performing Radio Access Technology (RAT) based security in mobile networks for service providers in accordance with some embodiments.

Example Processes for Radio Access Technology Based Security Enforcement in Mobile Networks for Service Providers FIG. 10 is a flow diagram of a process for performing Radio Access Technology (RAT) based security in mobile networks for service providers in accordance with some embodiments. In some embodiments, a process 1000 as shown in FIG. 10 is performed by the security platform and techniques as similarly described above including the embodiments described above with respect to FIGS. 1A-6. In one embodiment, process 1000 is performed by data appliance 500 as described above with respect to FIG. 5, network device 600 as described above with respect to FIG. 6, a virtual appliance, an SDN security solution, a cloud security service, and/or combinations or hybrid implementations of the aforementioned as described herein.

The process begins at 1002. At 1002, monitoring network traffic on a service provider network at the security platform to identify a RAT for a new session is performed. For example, the security platform (e.g., a firewall, a network sensor acting on behalf of the firewall, or another device/component that can implement security policies) can extract RAT information/parameters from GTP-C traffic on the mobile core network as similarly described above.

At 1004, associating the RAT with the new session at the security platform is performed. For example, the security platform can identify new sessions (e.g., data calls or other sessions) and associate the RAT and assigned IP address with the new flow (e.g., cached/stored in a table in a data plane of the security platform) as similarly described above.

At 1006, determining a security policy to apply at the security platform to the new session based on the RAT is performed. For example, the security policy can be determined and/or enforced based on various combinations of location, hardware identifier, subscriber identity, and RAT information and/or based on information detected/determined using DPI based firewall techniques, such as by performing URL filtering, identifying an Application-ID, identifying a Content-ID, and/or using other DPI based firewall techniques as similarly described above.

At 1008, enforcing the security policy on the new session using the security platform is performed. For example, various enforcement actions (e.g., allow/pass, block/drop, alert, tag, monitor, log, throttle, restrict access, and/or other enforcement actions) can be performed using the security platform as similarly described above.

Although the foregoing embodiments have been described in some detail for purposes of clarity of understanding, the invention is not limited to the details provided. There are many alternative ways of implementing the invention. The disclosed embodiments are illustrative and not restrictive.

The invention claimed is:

1. A system, comprising:
a processor configured to:
monitor network traffic on a service provider network at a security platform to identify a location, an application identifier, a signature, and a radio access technology (RAT) type for a new session, comprising to:
decrypt, using a cryptographic engine, the network traffic; traffic signature;
extract the location from a create session request message or a create PDP context request message from the network traffic, the location including three or more of the following: CGI (Cell Global Identifier), SAI (Service Area Identifier), RAI (Routing Area Identifier), TAI (Tracking Area Identifier), ECGI (E-UTRAN Cell Global Identifier), and LAC (Location Area Identifier);
determine the application identifier for user traffic associated with the new session at the security platform from the decrypted network traffic, comprising to:
monitor, via deep packet inspection, tunneled user traffic after the new session has been created to obtain the application identifier, wherein the application identifier relates to three of more of the following: web browsing using HyperText Transfer Protocol (HTTP), a Domain Name System (DNS) request, a file transfer using File Transfer Protocol (FTP), Telnet, Dynamic Host Configuration Protocol (DHCP), Transmission Control Protocol (TCP), User Datagram Protocol (UDP), or Trivial File Transfer Protocol (TFTP), and wherein the tunneled user traffic includes GPRS Tunneling Protocol User Plane (GTP-U) traffic;
  determine that the decrypted signature of the network traffic matches a predefined signature; and
  monitor GTP-C traffic in the decrypted network traffic to extract RAT information, comprising to:
    extract the RAT type from a create session request message in the monitored GTP-C traffic, wherein the RAT type includes three or more of the following: UTRAN, GERAN, WLAN, GAN, HSPA, EUTRAN, Virtual, or EUTRAN-NB-IoT;
  associate the location, the application identifier, the matched signature, and the RAT type with the new session at the security platform; and
  determine a security policy to apply at the security platform to the new session based on the location, the application identifier, the matched signature, and the RAT type; and
a memory coupled to the processor and configured to provide the processor with instructions.

2. The system recited in claim 1, wherein the security platform enforces a plurality of security policies based on the RAT type.

3. The system recited in claim 1, wherein the security platform performs security policy enforcement based on the RAT type.

4. The system recited in claim 1, wherein the security platform performs threat detection based on the RAT type.

5. The system recited in claim 1, wherein the security platform performs threat prevention based on the RAT type.

6. The system recited in claim 1, wherein the security platform performs Uniform Resource Link (URL) filtering based on the RAT type.

7. The system recited in claim 1, wherein the security platform monitors wireless interfaces including a plurality of interfaces for a control protocol and user data traffic in a mobile core network for a 3G and/or 4G network.

8. The system recited in claim 1, wherein the security platform monitors wireless interfaces including a plurality of interfaces for a GPRS Tunneling Protocol (GTP) in a mobile core network for a 3G and/or 4G network.

9. The system recited in claim 1, wherein the processor is further configured to:
  block the new session from accessing a resource based on the security policy.

10. A method, comprising:
  monitoring network traffic on a service provider network at a security platform to identify a location, an application identifier, a signature, and a radio access technology (RAT) type for a new session, comprising:
    decrypting, using a cryptographic engine, the network traffic signature;
    extracting the location from a create session request message or a create PDP context request message from the network traffic, the location including three or more of the following: CGI (Cell Global Identifier), SAI (Service Area Identifier), RAI (Routing Area Identifier), TAI (Tracking Area Identifier), ECGI (E-UTRAN Cell Global Identifier), and LAC (Location Area Identifier);
    determining the application identifier for user traffic associated with the new session at the security platform from the network traffic, comprising:
      monitoring, via deep packet inspection, tunneled user traffic after the new session has been created to obtain the application identifier, wherein the application identifier relates to three of more of the following: web browsing using HyperText Transfer Protocol (HTTP), a Domain Name System (DNS) request, a file transfer using File Transfer Protocol (FTP), Telnet, Dynamic Host Configuration Protocol (DHCP), Transmission Control Protocol (TCP), User Datagram Protocol (UDP), or Trivial File Transfer Protocol (TFTP), and wherein the tunneled user traffic includes GPRS Tunneling Protocol User Plane (GTP-U) traffic;
    determining that the decrypted signature of the network traffic matches a predefined signature; and
    monitoring GTP-C traffic in the network traffic to extract RAT information, comprising:
      extracting the RAT type from a create session request message in the monitored GTP-C traffic, wherein the RAT type includes three or more of the following: UTRAN, GERAN, WLAN, GAN, HSPA, EUTRAN, Virtual, or EUTRAN-NB-IoT;
  associating the location, the application identifier, the matched signature, and the RAT type with the new session at the security platform; and
  determining a security policy to apply at the security platform to the new session based on the location, the application identifier, the matched signature, and the RAT type.

11. The method of claim 10, further comprising:
enforcing a plurality of security policies based on the RAT type.

12. The method of claim 10, further comprising:
performing security policy enforcement based on the RAT type.

13. The method of claim 10, further comprising:
performing threat detection and/or threat prevention based on the RAT type.

14. The method of claim 10, further comprising:
performing Uniform Resource Link (URL) filtering based on the RAT type.

15. A computer program product, the computer program product being embodied in a non-transitory computer readable storage medium and comprising computer instructions for:
  monitoring network traffic on a service provider network at a security platform to identify a location, an application identifier, a signature, and a radio access technology (RAT) type for a new session, comprising:
    decrypting, using a cryptographic engine, the network traffic signature;
    extracting the location from a create session request message or a create PDP context request message from the network traffic, the location including three or more of the following: CGI (Cell Global Identifier), SAI (Service Area Identifier), RAI (Routing Area Identifier), TAI (Tracking Area Identifier), ECGI (E-UTRAN Cell Global Identifier), and LAC (Location Area Identifier);
    determining the application identifier for user traffic associated with the new session at the security platform from the network traffic, comprising:
      monitoring, via deep packet inspection, tunneled user traffic after the new session has been created to obtain the application identifier, wherein the application identifier relates to three of more of the following: web browsing using HyperText Transfer Protocol (HTTP), a Domain Name System (DNS) request, a file transfer using File Transfer Protocol (FTP), Telnet, Dynamic Host Configuration Protocol (DHCP), Transmission Control Protocol (TCP), User Datagram Protocol (UDP), or Trivial File Transfer Protocol (TFTP), and wherein the tunneled user traffic includes GPRS Tunneling Protocol User Plane (GTP-U) traffic;

determining that the decrypted signature of the network traffic matches a predefined signature; and monitoring GTP-C traffic in the network traffic to extract RAT information, comprising:

extracting the RAT type from a GTP create session request message in the monitored GTP-C traffic, wherein the RAT type includes three or more of the following: UTRAN, GERAN, WLAN, GAN, HSPA, EUTRAN, Virtual, or EUTRAN-NB-IoT;

associating the location, the application identifier, the matched signature, and the RAT type with the new session at the security platform; and determining a security policy to apply at the security platform to the new session based on the location, the application identifier, the matched signature, and the RAT type.

16. The computer program product recited in claim 15, further comprising computer instructions for:

enforcing a plurality of security policies based on the RAT type.

17. The computer program product recited in claim 15, further comprising computer instructions for:

performing security policy enforcement based on the RAT type.

18. The computer program product recited in claim 15, further comprising computer instructions for:

performing threat detection and/or threat prevention based on the RAT type.

19. The computer program product recited in claim 15, further comprising computer instructions for:

performing Uniform Resource Link (URL) filtering based on the RAT type.

20. The system recited in claim 1, wherein the RAT type includes the following: UTRAN, GERAN, WLAN, GAN, HSPA, EUTRAN, Virtual, and EUTRAN-NB-IoT.

* * * * *